US012113978B2

(12) United States Patent
Ohkawa et al.

(10) Patent No.: US 12,113,978 B2
(45) Date of Patent: *Oct. 8, 2024

(54) ENCODER, DECODER, ENCODING METHOD, AND DECODING METHOD

(71) Applicant: Panasonic Intellectual Property Corporation of America, Torrance, CA (US)

(72) Inventors: Masato Ohkawa, Toyama (JP); Hideo Saitou, Ishikawa (JP); Tadamasa Toma, Osaka (JP); Takahiro Nishi, Nara (JP); Kiyofumi Abe, Osaka (JP); Ryuichi Kanoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,653

(22) Filed: Jun. 27, 2023

(65) Prior Publication Data

US 2023/0345000 A1    Oct. 26, 2023

Related U.S. Application Data

(63) Continuation of application No. 16/911,810, filed on Jun. 25, 2020, now Pat. No. 11,729,386, which is a
(Continued)

(51) Int. Cl.
*H04N 19/12* (2014.01)
*H04N 19/124* (2014.01)
(Continued)

(52) U.S. Cl.
CPC .......... *H04N 19/12* (2014.11); *H04N 19/124* (2014.11); *H04N 19/176* (2014.11); *H04N 19/625* (2014.11)

(58) Field of Classification Search
None
See application file for complete search history.

(56) References Cited

U.S. PATENT DOCUMENTS 10,306,229 B2 *   5/2019   Zhao ..................... H04N 19/122
10,750,181 B2 *   8/2020   Huang ................. H04N 19/139
(Continued)

OTHER PUBLICATIONS

International Search Report issued Feb. 19, 2019 in International (PCT) Application No. PCT/JP2018/046694.
(Continued)

*Primary Examiner* — Chikaodili E Anyikire
(74) *Attorney, Agent, or Firm* — Wenderoth, Lind & Ponack, L.L.P.

(57) ABSTRACT

When a transform-basis adaptive selection mode is enabled, an encoder that transforms residuals of a current block to encode an image: adaptively selects a first horizontal transform basis from among one or more transform basis candidates when a horizontal size of the current block is greater than a first horizontal threshold size; otherwise selects a fixed horizontal transform basis as a first horizontal transform basis; adaptively selects a first vertical transform basis from among the one or more transform basis candidates when a vertical size of the current block is greater than a first vertical threshold size; otherwise selects a fixed vertical transform basis as a first vertical transform basis; and generates first transform coefficients by performing a first horizontal transform and a first vertical transform on the residuals of the current block, using the first horizontal transform basis selected and the first vertical transform basis selected, respectively.

4 Claims, 40 Drawing Sheets

Related U.S. Application Data continuation of application No. PCT/JP2018/046694, filed on Dec. 19, 2018.

(60) Provisional application No. 62/611,242, filed on Dec. 28, 2017, provisional application No. 62/611,259, filed on Dec. 28, 2017.

(51) Int. Cl.
*H04N 19/176* (2014.01)
*H04N 19/625* (2014.01)

(56) References Cited

U.S. PATENT DOCUMENTS

| | | | |
|---|---|---|---|
| 10,904,526 B2* | 1/2021 | Lee | H04N 19/176 |
| 2016/0219290 A1* | 7/2016 | Zhao | H04N 19/167 |
| 2017/0094314 A1* | 3/2017 | Zhao | H04N 19/625 |
| 2019/0222843 A1* | 7/2019 | Lee | H04N 19/159 |
| 2021/0243475 A1* | 8/2021 | Tsukuba | H04N 19/12 |

OTHER PUBLICATIONS

H. 265(ISO/IEC 23008-2 HEVC (High Efficiency Video Coding)), Dec. 1, 2013.

Jianle Chen, et al., "Algorithm Description of Joint Exploration Test Model 5", Joint Video Exploration Team (JVET) of ITU-T SG 16 WP 3 and ISO/IEC JTC 1/SC 29/WG 11, Document: JVET-E1001_v1, Jan. 2017, pp. 1-41.

Tadamada Toma, et al., "Description of SDR video coding technology proposal by Panasonic", Joint Video Experts Team (JVET) of ITU-T SG 16 WP 3 and ISO/IEC JTC 1/SC 29/WG 11, Document: JVET-J0020-v1, Apr. 2018.

Kiyofumi Abe, et al., "CE6: AMT and NSST complexity reduction (CE6-3.3)", Joint Video Exploration Team (JVET) of ITU-T SG 16 WP 3 and ISO/IEC JTC 1/SC 29/WG 11, Document: JVET-K0127-v2, Jul. 2018.

Zhao et al., Enhanced Multiple Transform for Video Coding, 2016, Data Compression Conference, Dec. 19, 2016, pp. 73-82.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> WHERE $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$ <br> WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

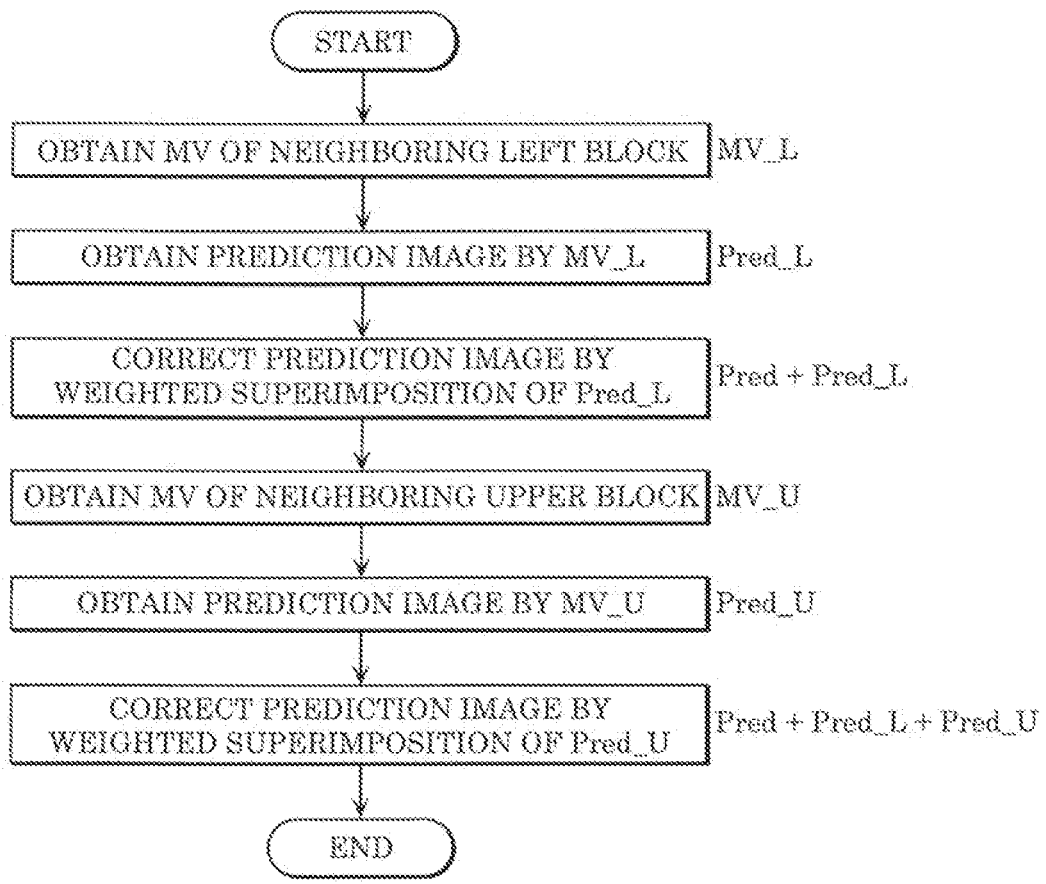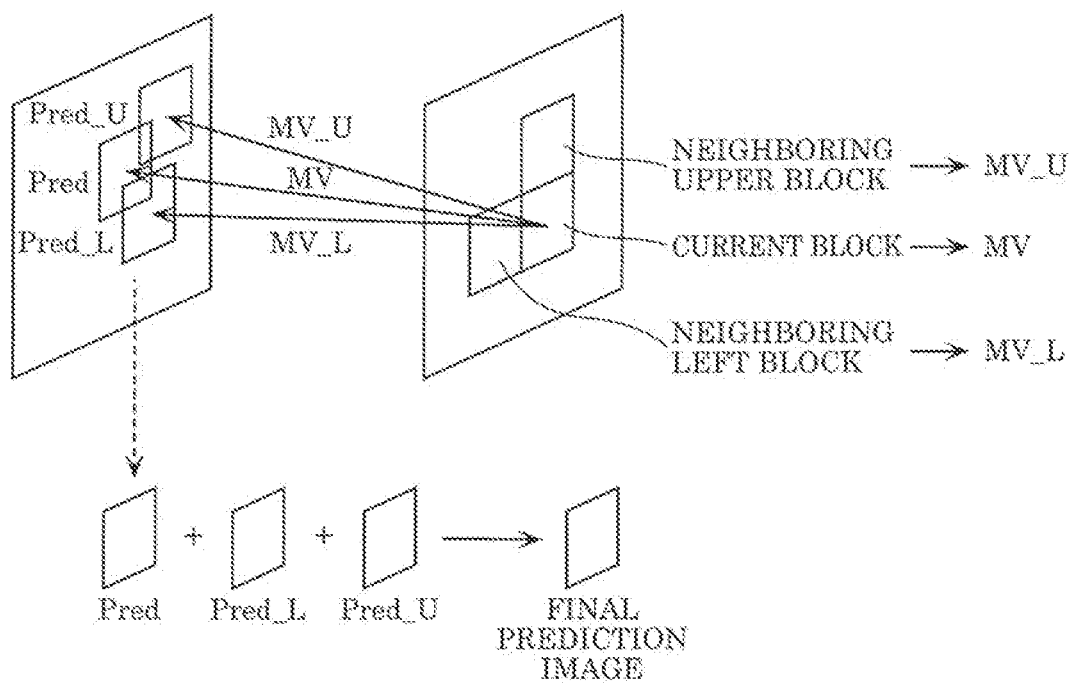

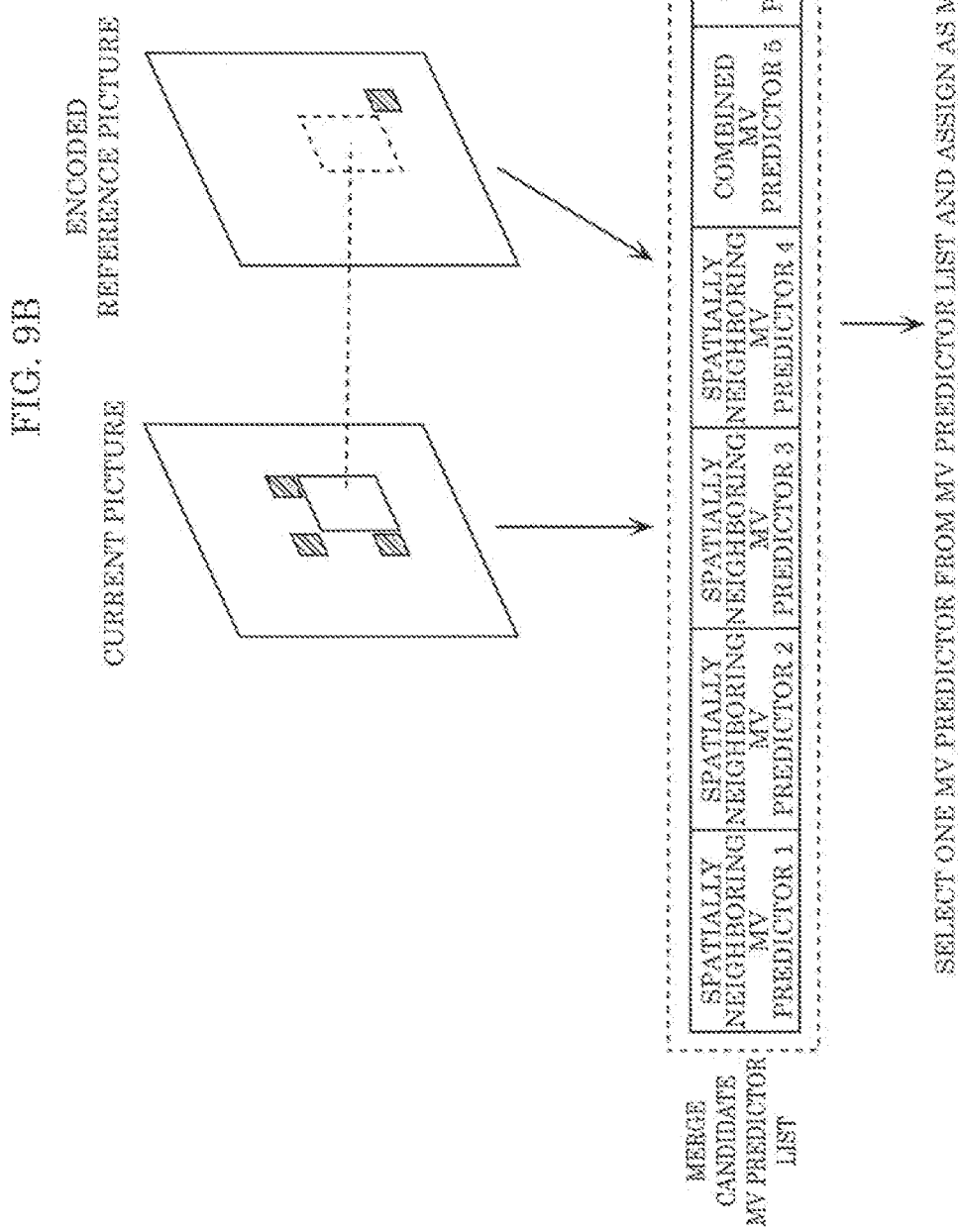

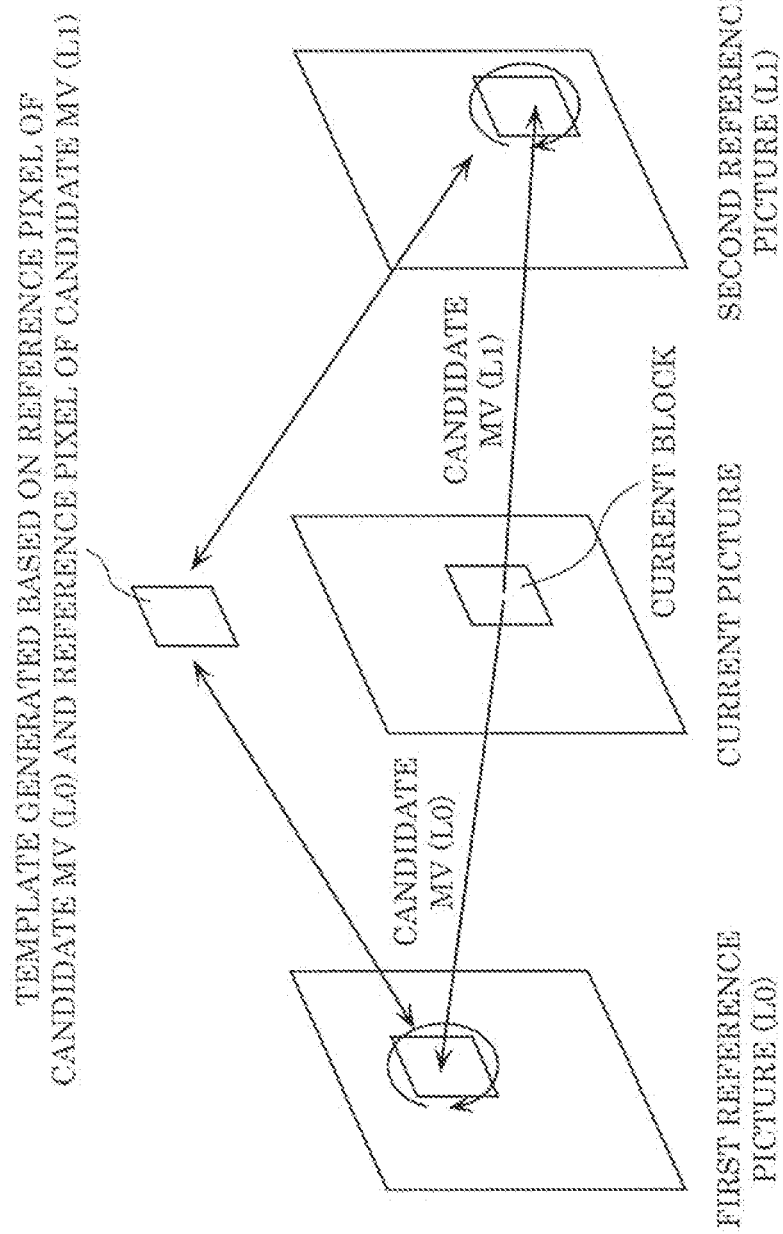

FIG. 14

```
1   Coding_unit()
2   {
3      emt_cu_flag;                    // Signal emt flag;
4      if(emt_cu_flag) {
5         if(horizontal_tu_size > horizontal_tu_size_th) {
6            emt_horizotal_tridx;      // Signal horizontal transform type index
7         }
8         else {
9            // No signaling
10        }
11        if(vertical_tu_size > vertical_tu_size_th) {
12           emt_vertical_tridx;       // Signal vertical transform type index
13        }
14        else {
15           // No signaling
16        }
17     }
       ⋮
18     coeff;    // Signal coeff.
       ⋮
19     if(emt_cu_flag) {
20        secondary_tridx;    // Signal secondary transform type index
21     }
22     else {
23        // No signaling
24     }
```

FIG. 15

| SIZE | | WHEN TRANSFORM-BASIS ADAPTIVE SELECTION MODE IS DISABLED | | | WHEN TRANSFORM-BASIS ADAPTIVE SELECTION MODE IS ENABLED | | | | | | | | |
|---|---|---|---|---|---|---|---|---|---|---|---|---|---|
| | | FIRST TRANSFORM OPERATION | SECOND TRANSFORM OPERATION | SIGNAL ENCODING | FIRST TRANSFORM OPERATION | | | | SECOND TRANSFORM OPERATION | SIGNAL ENCODING | | | |
| HORIZONTAL | VERTICAL | FIRST TRANSFORM BASIS HORIZONTAL/VERTICAL | SECOND TRANSFORM | secondary_tridx | index0 HORIZONTAL/VERTICAL | index1 HORIZONTAL/VERTICAL | index2 HORIZONTAL/VERTICAL | index3 HORIZONTAL/VERTICAL | SECOND TRANSFORM | emt_ca_flag | emt_horizontal_tridx | emt_vertical_tridx | secondary_tridx |
| H <= 4 | V <= 4 | DCT-II/DCT-II | ON | O | DST-VII/DST-VII | DST-VII/Other | | | OFF | O | | | |
| H <= 4 | V > 4 | DCT-II/DCT-II | ON | O | DST-VII/DST-VII | DST-VII/Other | | | OFF | O | | O | |
| H > 4 | V <= 4 | DCT-II/DCT-II | ON | O | DST-VII/DST-VII | DST-VII/Other | Other/DST-VII | | OFF | O | O | | |
| H > 4 | V > 4 | DCT-II/DCT-II | ON | O | DST-VII/DST-VII | DST-VII/Other | Other/DST-VII | Other/Other | OFF | O | O | O | |

FIG. 18

```
1   Coding_unit()
2   {
3     if((horizontal_tu_size > horizontal_tu_size_th) || (vertical_tu_size >
4     vertical_tu_size_th)) {
5        emt_cu_flag;                // Signal emt flag:
6        if(emt_cu_flag) {
7           if(horizontal_tu_size > horizontal_tu_size_th) {
8              emt_horizotal_tridx;  // Signal horizontal transform type index
9           }
10          else {
11             // No signaling
12          }
13          if(vertical_tu_size > vertical_tu_size_th) {
14             emt_vertical_tridx;   // Signal vertical transform type index
15          }
16          else {
17             // No signaling
18          }
19       }
20     } else {
21        emt_cu_flag = 0; // No signaling(Initialize emt_cu_flag to zero)
22     }
      :
23     coeff;   // Signal coeff.
      :
24     if(emt_cu_flag) {
25        secondary_tridx;   // Signal secondary transform type index
26     }
27     else {
28        // No signaling
29     }
```

FIG. 19

| | | | WHEN TRANSFORM-BASIS ADAPTIVE SELECTION MODE IS DISABLED | | | WHEN TRANSFORM-BASIS ADAPTIVE SELECTION MODE IS ENABLED | | | | | | | |
|---|---|---|---|---|---|---|---|---|---|---|---|---|---|
| | | | FIRST TRANSFORM OPERATION | SECOND TRANSFORM OPERATION | SIGNAL ENCODING | FIRST TRANSFORM OPERATION | | | | SECOND TRANSFORM OPERATION | SIGNAL ENCODING | | |
| SIZE | SIZE | | FIRST TRANSFORM BASIS HORIZONTAL/ VERTICAL | SECOND TRANSFORM | secondary_tridx | index0 HORIZONTAL/ VERTICAL | index1 HORIZONTAL/ VERTICAL | index2 HORIZONTAL/ VERTICAL | index3 HORIZONTAL/ VERTICAL | SECOND TRANSFORM | emt_cu_flag | emt_horizontal_tridx | emt_vertical_tridx | secondary_tridx |
| HORIZONTAL | VERTICAL | | | | | | | | | | | | | |
| H <= 4 | V <= 4 | | DST-VII/ DST-VII | ON | | DST-VII/ DST-VII | | | | | | | | |
| H <= 4 | V > 4 | | DCT-II/ DCT-II | ON | O | DST-VII/ DST-VII | DST-VII/ Other | | | OFF | O | O | | |
| H > 4 | V <= 4 | | DCT-II/ DCT-II | ON | O | DST-VII/ DST-VII | DST-VII/ Other | Other/ DST-VII | | OFF | O | O | O | |
| H > 4 | V > 4 | | DCT-II/ DCT-II | ON | O | DST-VII/ DST-VII | DST-VII/ Other | Other/ DST-VII | Other/ Other | OFF | O | O | O | |

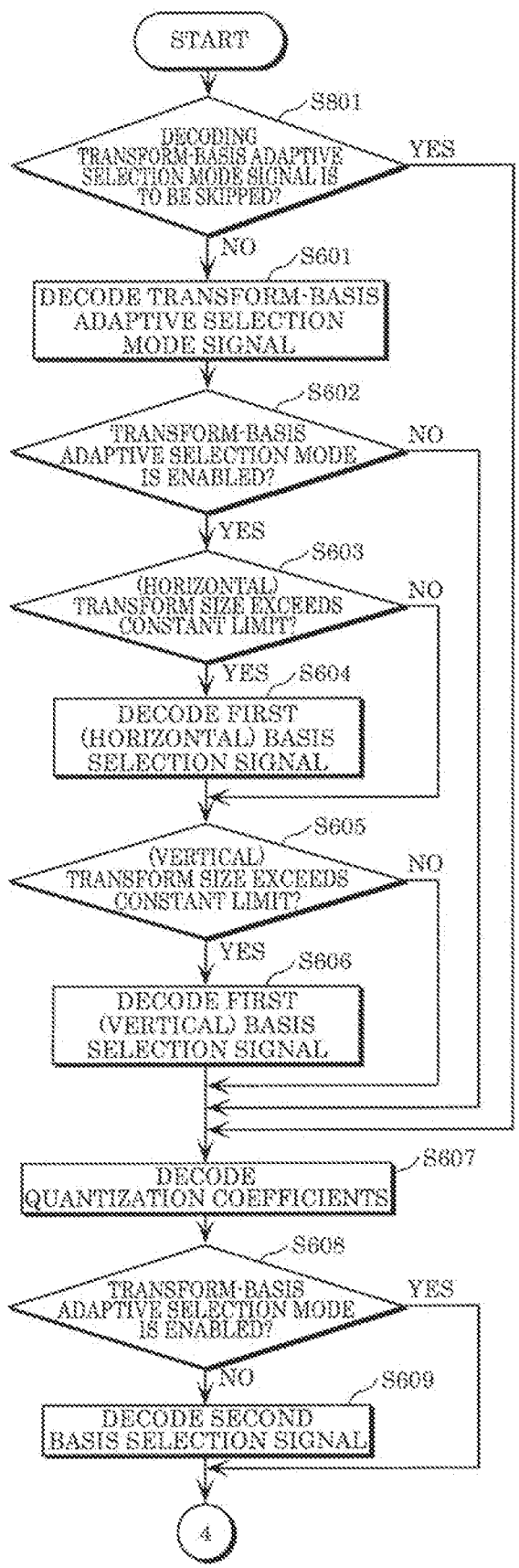

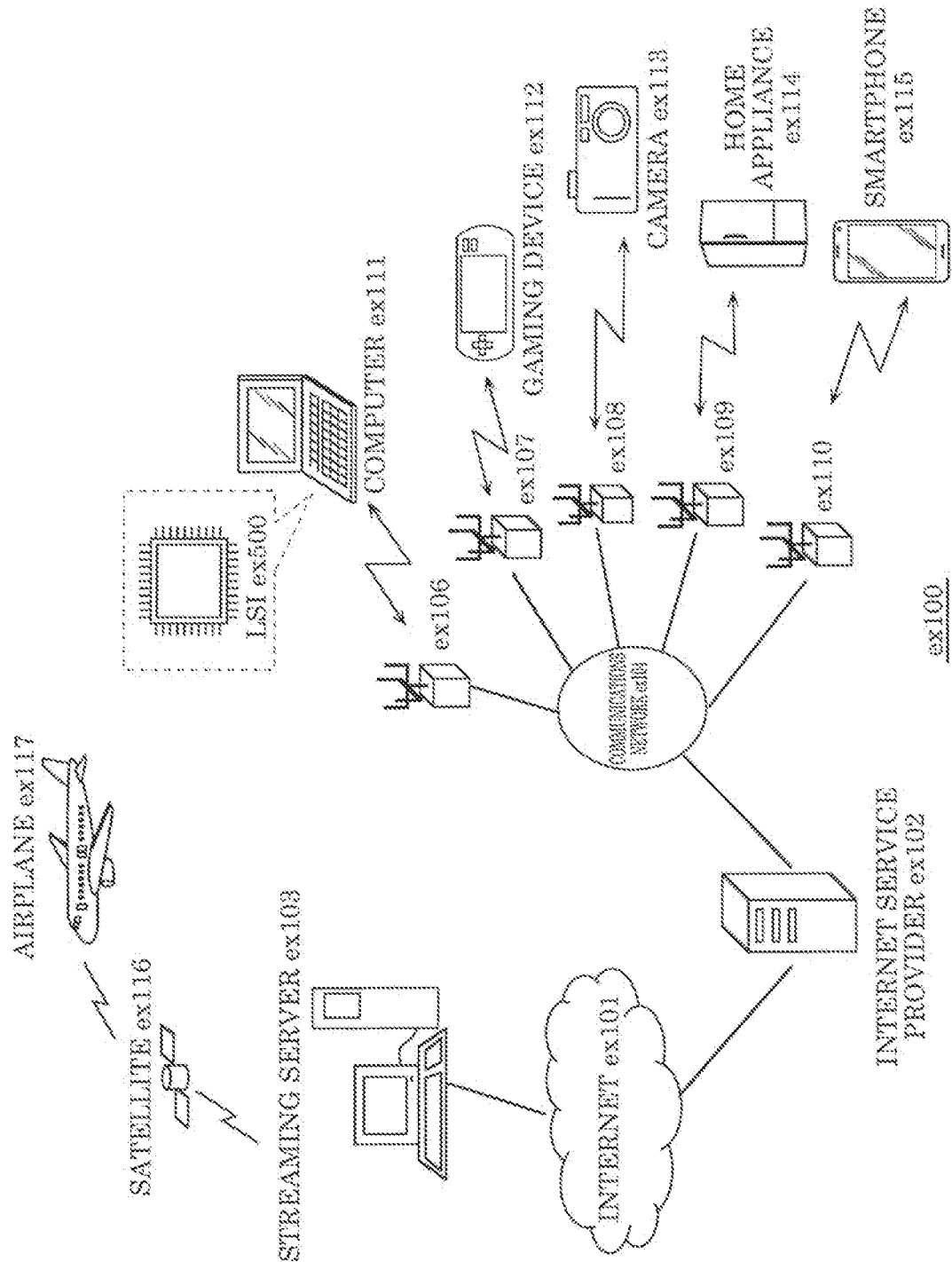

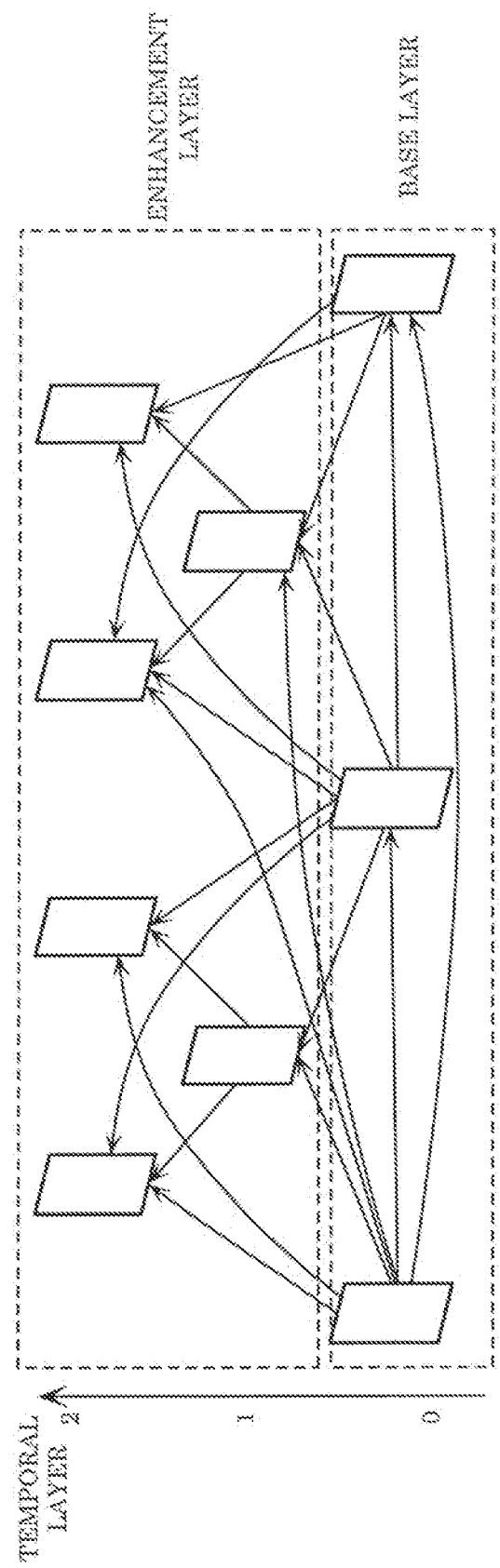

ENCODER, DECODER, ENCODING METHOD, AND DECODING METHOD

BACKGROUND

1. Technical Field

The present disclosure relates to an encoder, a decoder, an encoding method, and a decoding method.

2. Description of the Related Art

A video coding standard called High-Efficiency Video Coding (HEVC) has been created by Joint Collaborative Team on Video Coding (JCT-VC).

SUMMARY

An encoder according to an aspect of the present disclosure is an encoder that transforms residuals of a current block to encode an image, the encoder including: circuitry; and memory. Using the memory, the circuitry: determines whether a transform-basis adaptive selection mode for adaptively selecting a transform basis from among one or more transform basis candidates is enabled or disabled for the current block; when the transform-basis adaptive selection mode is enabled, adaptively selects a first horizontal transform basis from among the one or more transform basis candidates when a horizontal size of the current block is greater than a first horizontal threshold size; selects a fixed horizontal transform basis as a first horizontal transform basis when the horizontal size of the current block is smaller than or equal to the first horizontal threshold size; adaptively selects a first vertical transform basis from among the one or more transform basis candidates when a vertical size of the current block is greater than a first vertical threshold size; selects a fixed vertical transform basis as a first vertical transform basis when the vertical size of the current block is smaller than or equal to the first vertical threshold size; and generates first transform coefficients by performing a first horizontal transform and a first vertical transform on the residuals of the current block, using the first horizontal transform basis selected and the first vertical transform basis selected, respectively.

A decoder according to an aspect of the present disclosure is a decoder that performs an inverse transform on a current block to decode an image, the decoder including: circuitry; and memory. Using the memory, the circuitry: determines whether a transform-basis adaptive selection mode for adaptively selecting a transform basis from among one or more transform basis candidates is enabled or disabled for the current block; when the transform-basis adaptive selection mode is enabled, when a horizontal size of the current block is greater than a first horizontal threshold size, decodes, from a bitstream, first information that includes information indicating a first horizontal inverse transform basis, and performs a first horizontal inverse transform on the current block, using the first horizontal inverse transform basis indicated by the first information; when the horizontal size of the current block is smaller than or equal to the first horizontal threshold size, performs the first horizontal inverse transform on the current block, using a fixed horizontal transform basis as the first horizontal inverse transform basis; when a vertical size of the current block is greater than a first vertical threshold size, decodes, from the bitstream, the first information that includes information indicating a first vertical inverse transform basis, and performs a first vertical inverse transform on the current block, using the first vertical inverse transform basis indicated by the first information; and when the vertical size of the current block is smaller than or equal to the first vertical threshold size, performs the first vertical inverse transform on the current block, using a fixed vertical transform basis as the first vertical inverse transform basis.

Note that these general and specific aspects may be implemented using a system, a method, an integrated circuit, a computer program, a computer-readable recording medium such as a CD-ROM, or any combination of systems, methods, integrated circuits, computer programs, and recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 5B is a flow chart for illustrating an outline of a prediction image correction process performed via OBMC processing;

FIG. 5C is a conceptual diagram for illustrating an outline of a prediction image correction process performed via OBMC processing;

FIG. 9B is for illustrating an outline of a process for deriving a motion vector via merge mode;

FIG. 9C is a conceptual diagram for illustrating an outline of DMVR processing;

FIG. 14 illustrates a specific example of syntax in the second aspect of Embodiment 1;

FIG. 15 illustrates specific examples of transform bases used in the second aspect of Embodiment 1 and whether to encode signals;

FIG. 18 illustrates a specific example of syntax in the fourth aspect of Embodiment 1;

FIG. 19 illustrates specific examples of transform bases used in the fourth aspect of Embodiment 1 and whether to encode signals;

FIG. 24A is a flowchart illustrating processing performed by the entropy decoder of the decoder according to an eighth aspect of Embodiment 1;

FIG. 25 illustrates an overall configuration of a content providing system for implementing a content distribution service;

FIG. 26 illustrates one example of an encoding structure in scalable encoding;

DETAILED DESCRIPTION OF THE EMBODIMENTS

Figure 1:
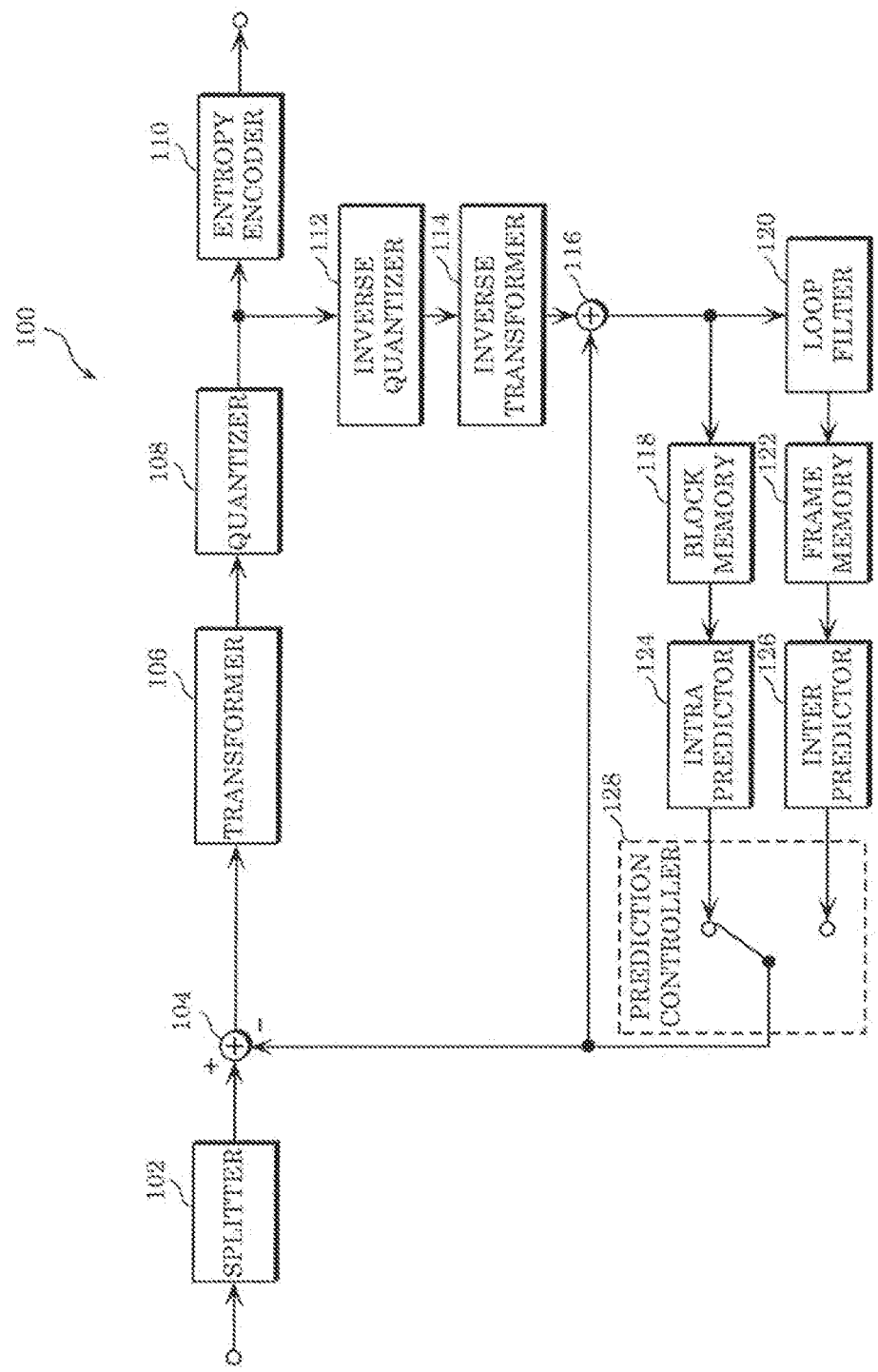
FIG. 1 is a block diagram illustrating a functional configuration of an encoder according to Embodiment 1.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

Encoder Outline

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

Splitter

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
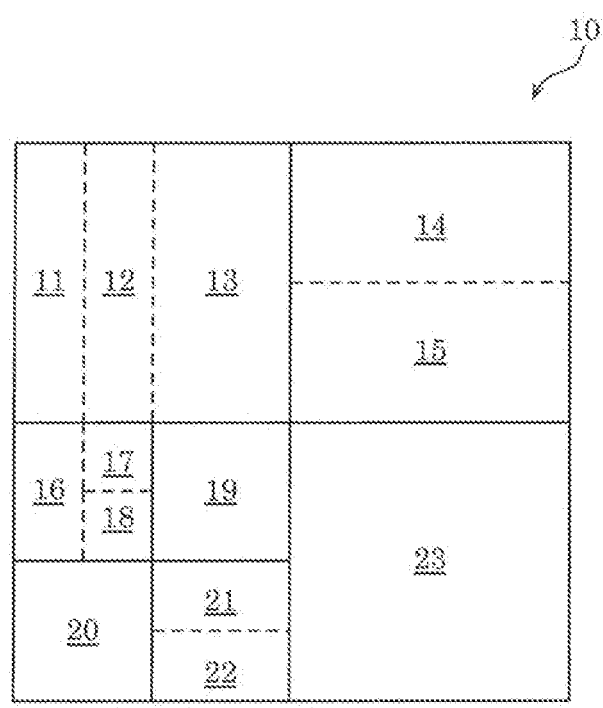
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

Subtractor

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

Transformer

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

Quantizer

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

Entropy Encoder

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

Inverse Quantizer

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

Inverse Transformer

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

Adder

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

Block Memory

Block memory 118 is storage for storing blocks in a picture to be encoded (hereinafter referred to as a current picture) for reference in intra prediction. More specifically, block memory 118 stores reconstructed blocks output from adder 116.

Loop Filter

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
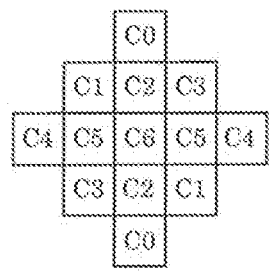
FIG. 4A illustrates one example of a filter shape used in ALF.
Figure 4B:
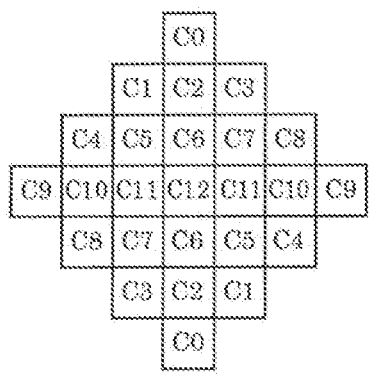
FIG. 4B illustrates another example of a filter shape used in ALF.
Figure 4C:
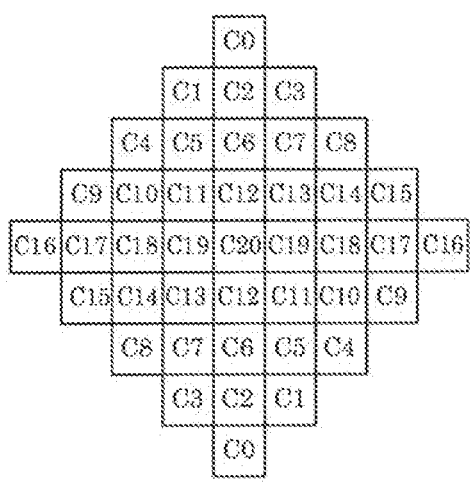
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

Frame Memory

Frame memory 122 is storage for storing reference pictures used in inter prediction, and is also referred to as a frame buffer. More specifically, frame memory 122 stores reconstructed blocks filtered by loop filter 120.

Intra Predictor

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see H.265 (ISO/IEC 23008-2 HEVC (High Efficiency Video Coding))).

Figure 5A:
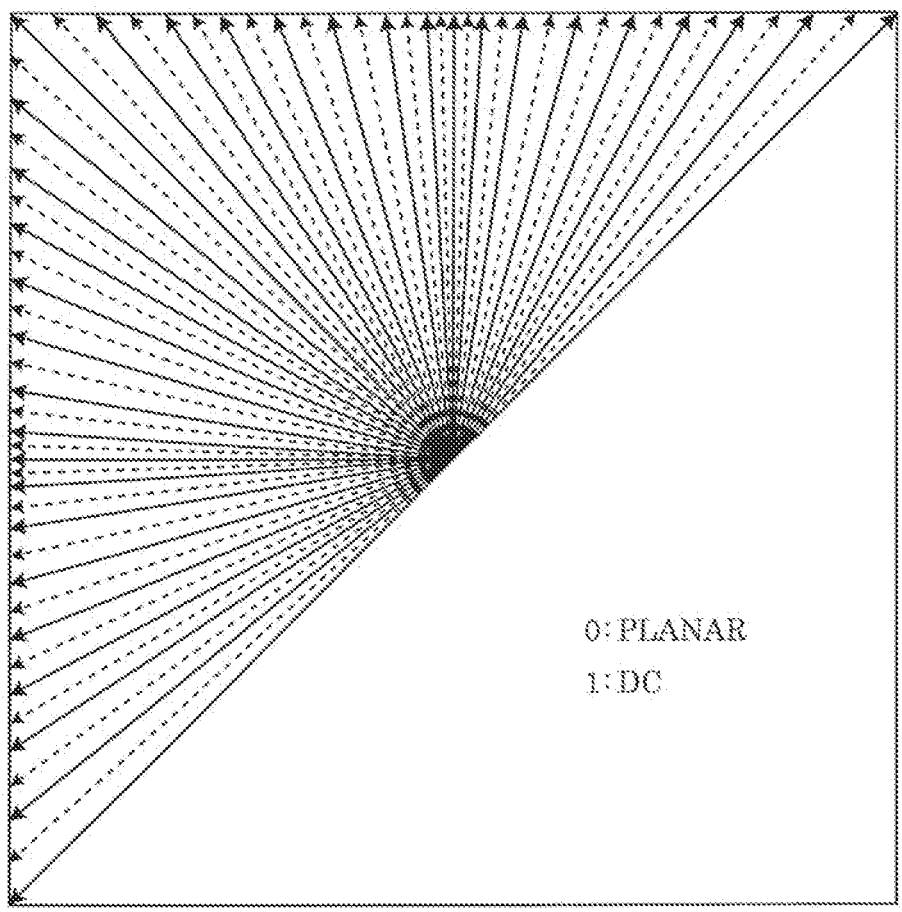
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

Inter Predictor

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
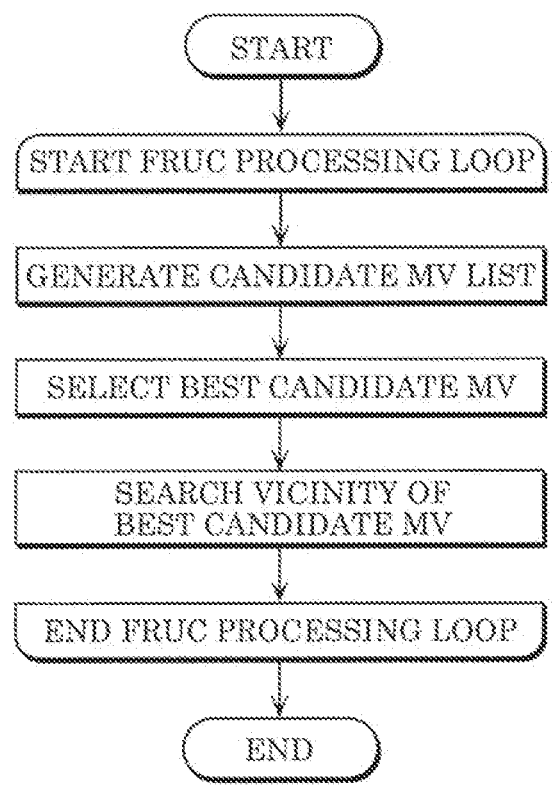
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
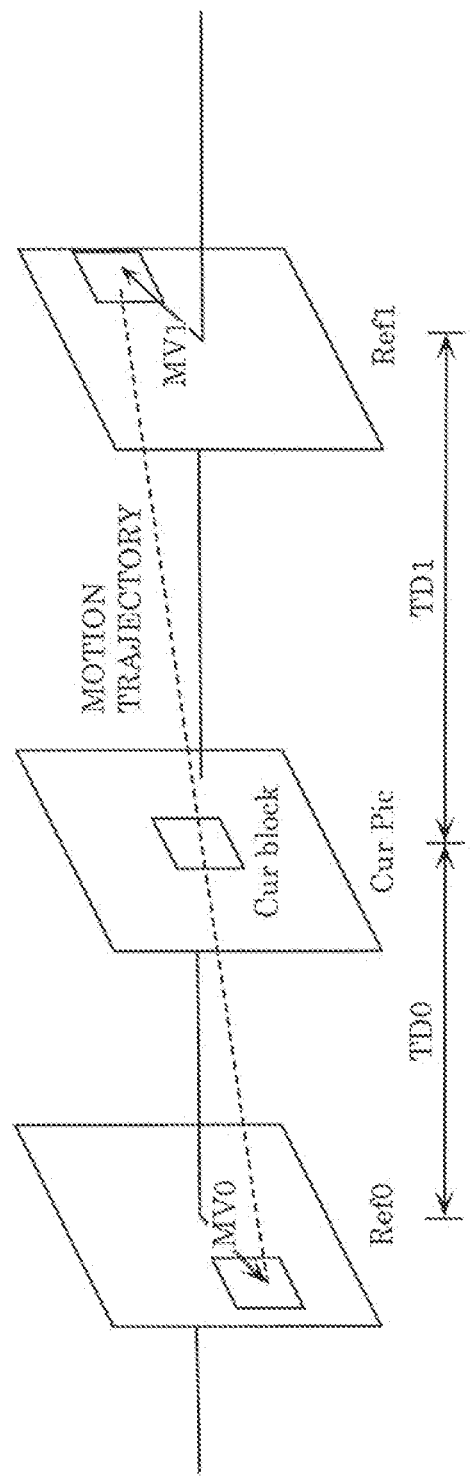
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
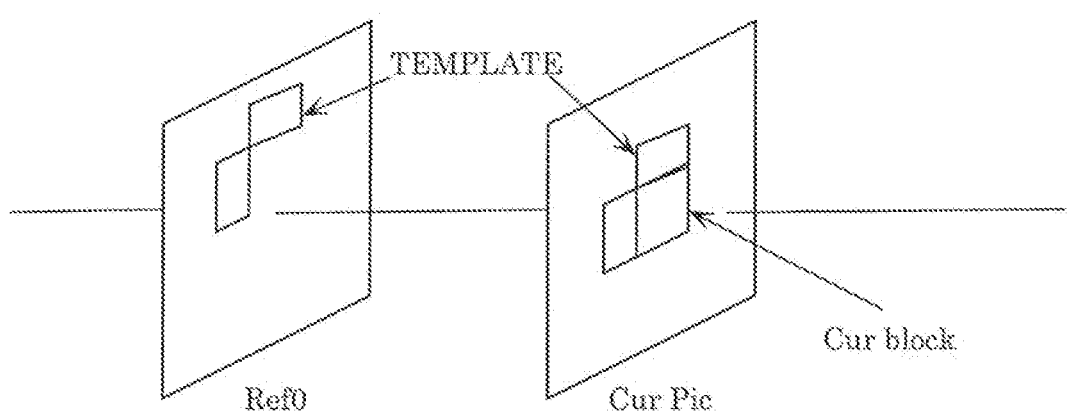
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
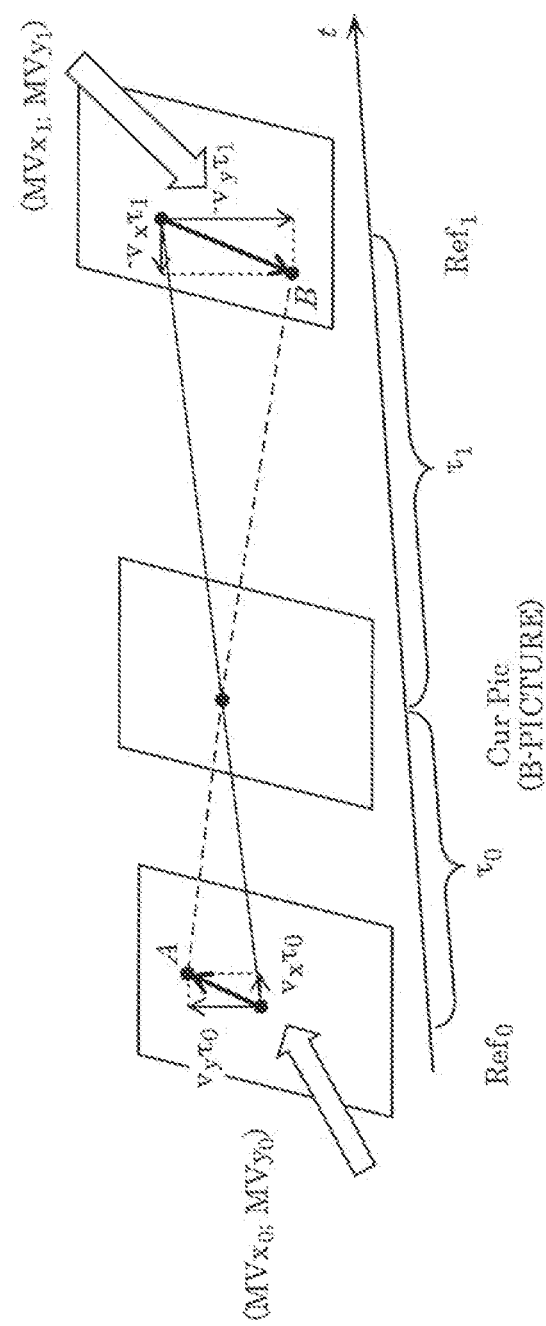
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given. MATH. 1

$$\partial I^{(k)}/\partial t + v_x \partial I^{(k)}/\partial x + v_y \partial I^{(k)}/\partial y = 0. \tag{1}$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
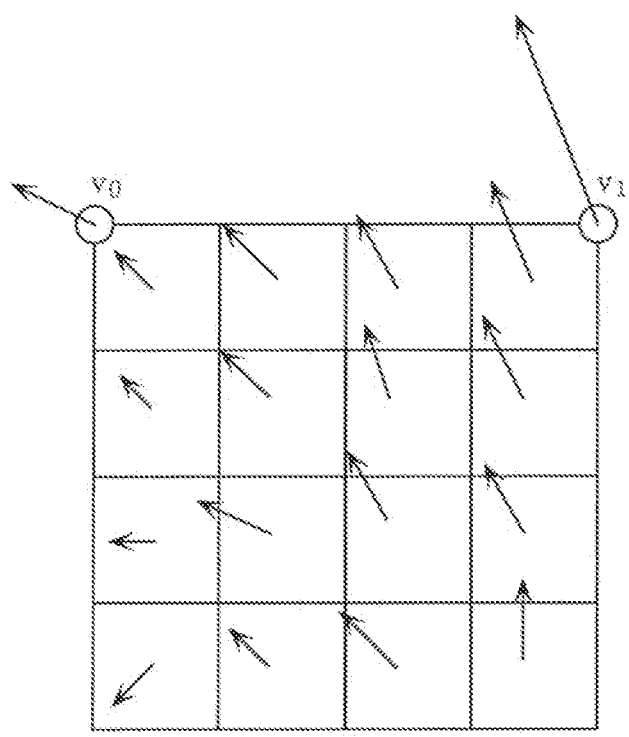
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below. MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

Prediction Controller

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing to be described later by using the MV of the current block derived via merge mode.

Here, an example of determining an MV by using DMVR processing will be given.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the LI direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
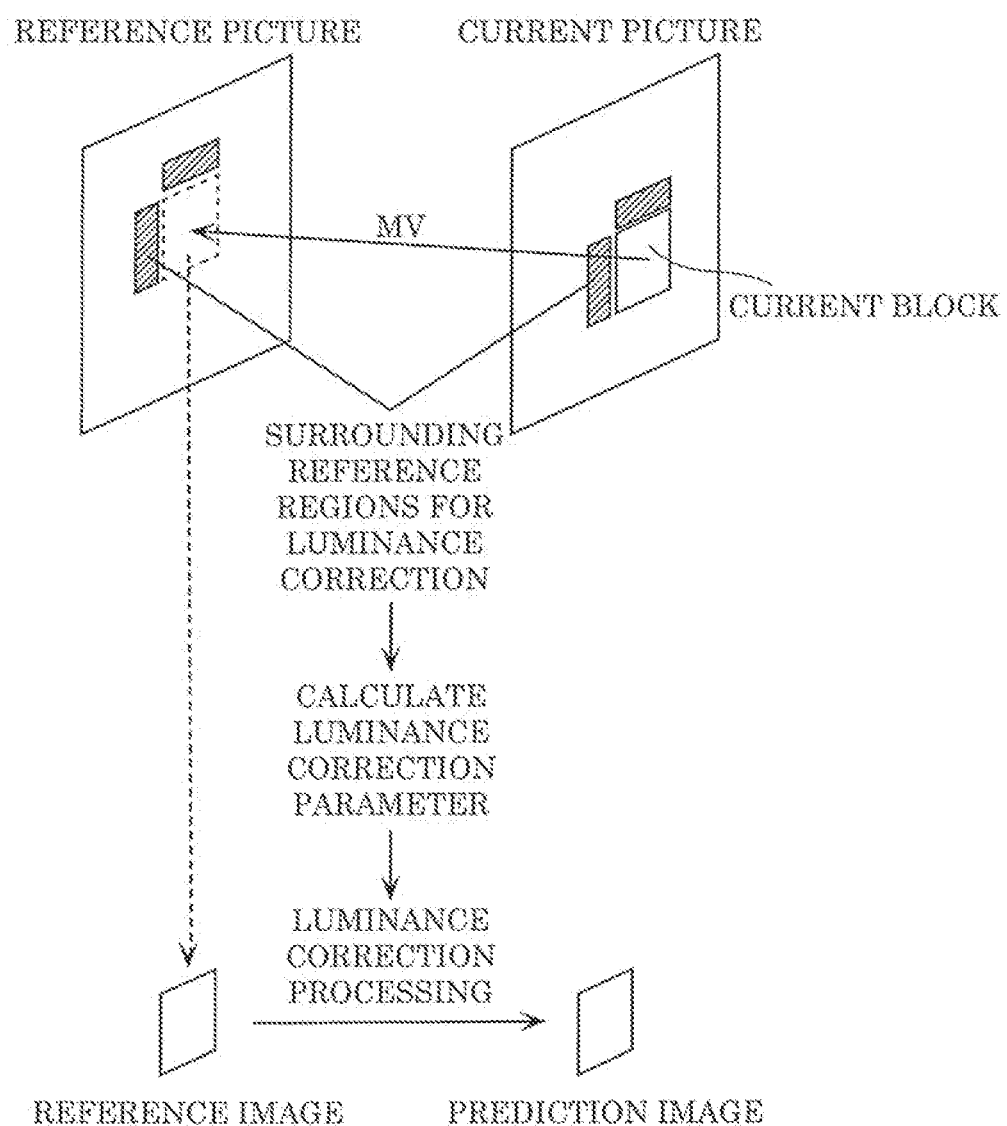
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

Decoder Outline

Figure 10:
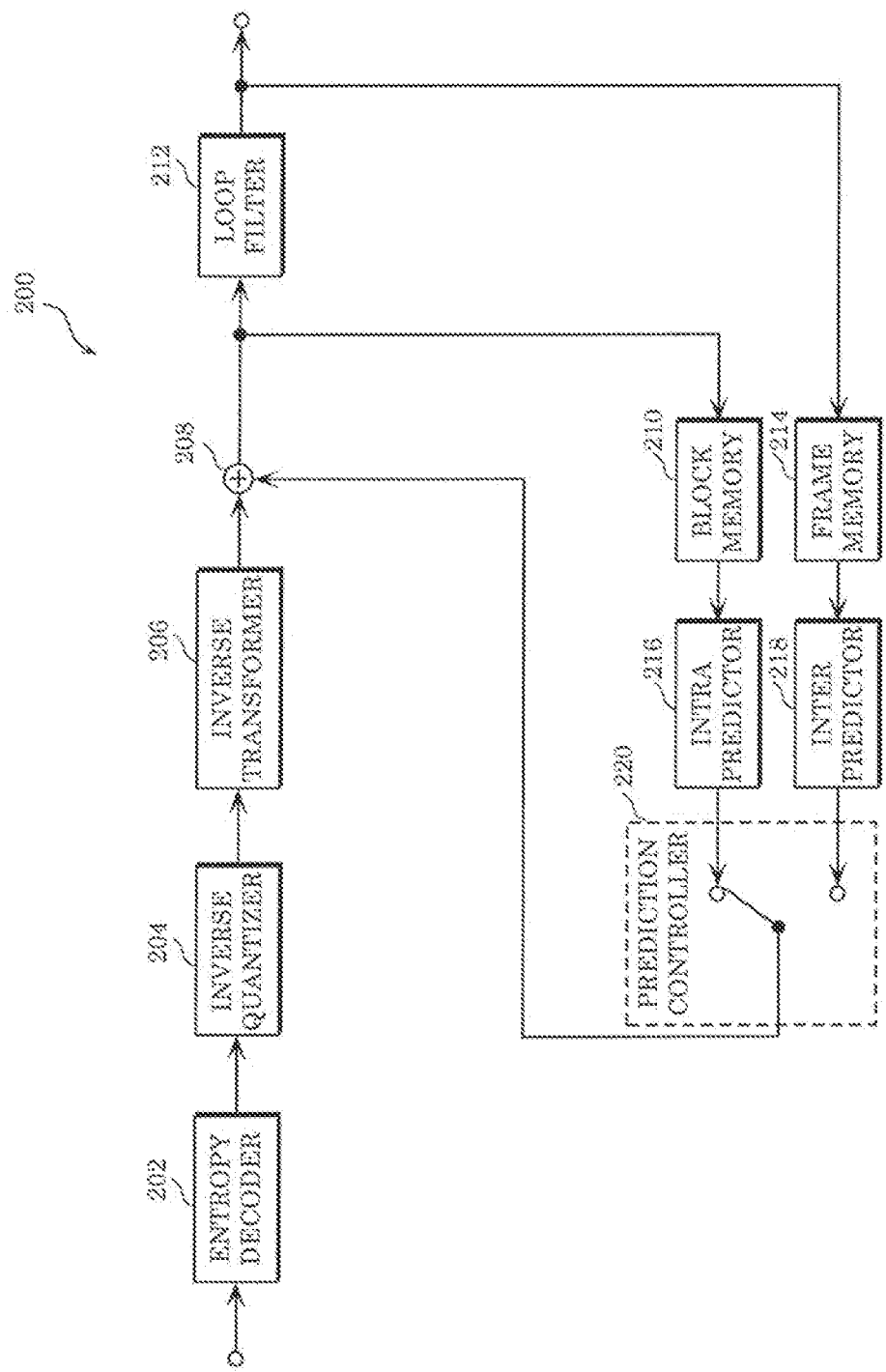
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

Entropy Decoder

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

Inverse Quantizer

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

Inverse Transformer

Inverse transformer 206 restores prediction s by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

Adder

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

Block Memory

Block memory 210 is storage for storing blocks in a picture to be decoded (hereinafter referred to as a current picture) for reference in intra prediction. More specifically, block memory 210 stores reconstructed blocks output from adder 208.

Loop Filter

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

Frame Memory

Frame memory 214 is storage for storing reference pictures used in inter prediction, and is also referred to as a frame buffer. More specifically, frame memory 214 stores reconstructed blocks filtered by loop filter 212.

Intra Predictor

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

Inter Predictor

Inter predictor 218 predicts the current block with reference to a reference picture stored in frame memory 214.

Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

Prediction Controller

Prediction controller 220 selects either the intra prediction signal or the inter prediction signal, and outputs the selected prediction signal to adder 208.

First Aspect of Embodiment 1

The following specifically describes a first aspect of Embodiment 1 with reference to the drawings.

Internal Configuration of Transformer of Encoder

Figure 11A:
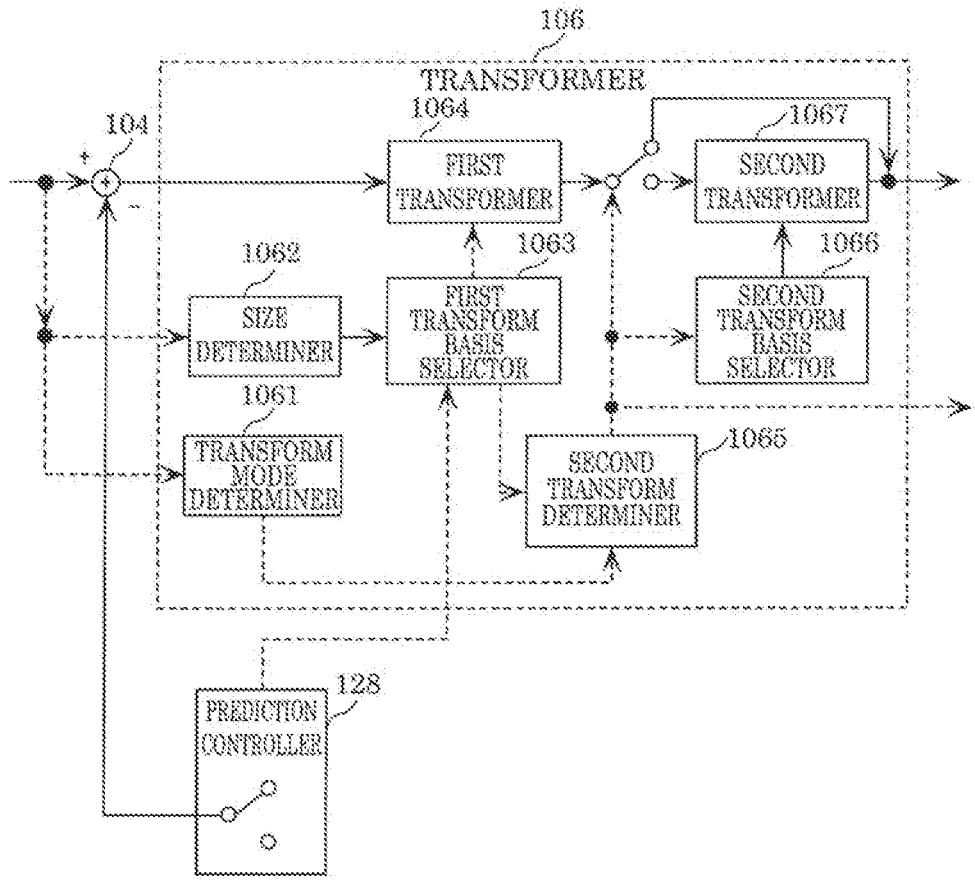
FIG. 11A is a block diagram illustrating an internal configuration of a transformer of the encoder according to a first aspect of Embodiment 1.

First, an internal configuration of transformer 106 of encoder 100 according to this aspect is to be described with reference to FIG. 11A. FIG. 11A is a block diagram illustrating an internal configuration of transformer 106 of encoder 100 according to the first aspect of Embodiment 1.

As illustrated in FIG. 11A, transformer 106 according to this aspect includes transform mode determiner 1061, size determiner 1062, first transform basis selector 1063, first transformer 1064, second transform determiner 1065, second transform basis selector 1066, and second transformer 1067.

Transform mode determiner 1061 determines whether a transform-basis adaptive selection mode is enabled or disabled for a current block to be encoded. The transform-basis adaptive selection mode is for adaptively selecting a transform basis from among one or more first transform basis candidates. Whether the transform-basis adaptive selection mode is enabled or disabled is determined based on, for example, a first transform basis or identification information of the transform-basis adaptive selection mode.

Size determiner 1062 determines whether the horizontal size of the current block is greater than a first horizontal threshold size. Furthermore, size determiner 1062 determines whether the vertical size of the current block is greater than a first vertical threshold size. The first horizontal threshold size may be the same as or different from the first vertical threshold size. The first horizontal threshold size and the first vertical threshold size may be defined in a standard in advance, for example. For example, the first horizontal threshold size and the first vertical threshold size may be determined based on an image, and encoded in a bitstream.

First transform basis selector 1063 selects a first transform basis. In the present disclosure, selecting a basis includes determining or setting at least one basis without using basis candidates, in addition to selecting at least one basis from among basis candidates.

When the transform-basis adaptive selection mode is disabled, first transform basis selector 1063 selects one basic transform basis as a first horizontal transform basis and a vertical transform basis. When the transform-basis adaptive selection mode is enabled, first transform basis selector 1063 selects, based on the horizontal and vertical sizes of the current block, the first horizontal transform basis and the vertical transform basis as shown in (1) to (4) below.

(1) When the horizontal size of the current block is greater than the first horizontal threshold size, first transform basis selector 1063 adaptively selects the first horizontal transform basis from among one or more transform basis candidates.

(2) When the horizontal size of the current block is smaller than or equal to the first horizontal threshold size, first transform basis selector 1063 selects a fixed horizontal transform basis as the first horizontal transform basis.

(3) When the vertical size of the current block is greater than the first vertical threshold size, first transform basis selector 1063 adaptively selects the first vertical transform basis from among one or more transform basis candidates.

(4) When the vertical size of the current block is smaller than or equal to the first vertical threshold size, first transform basis selector 1063 selects a fixed vertical transform basis as the first vertical transform basis.

The fixed horizontal transform basis may be the same as or different from the fixed vertical transform basis. As the fixed horizontal and vertical transform bases, for example, a transform basis of discrete sine transform of type 7 (DST-VII) can be used.

First transformer 1064 generates first transform coefficients by performing a first transform on residuals of the current block using the first transform bases selected by first transform basis selector 1063. Specifically, first transformer 1064 performs a first horizontal transform using the first horizontal transform basis, and performs a first vertical transform using the first vertical transform basis.

Second transform determiner 1065 determines whether to perform a second transform for further transforming the first transform coefficients, based on whether the transform-basis adaptive selection mode is enabled or disabled for the current block. Specifically, second transform determiner 1065 performs the second transform when the transform-basis adaptive selection mode is disabled, and determines not to perform the second transform when the transform-basis adaptive selection mode is enabled.

When second transform determiner 1065 determines that the second transform is to be performed, second transform basis selector 1066 selects a second transform basis. Thus, second transform basis selector 1066 selects the second transform basis when the transform-basis adaptive selection mode is disabled. On the contrary, when the transform-basis adaptive selection mode is enabled, second transform basis selector 1066 does not select the second transform basis. Thus, second transform basis selector 1066 skips selection of the second transform basis when the transform-basis adaptive selection mode is enabled.

When second transform determiner 1065 determines that the second transform is to be performed, second transformer 1067 transforms the first transform coefficients using the second transform basis selected by second transform basis selector 1066. Thus, when the transform-basis adaptive selection mode is disabled, second transformer 1067 generates second transform coefficients by performing the second transform on the first transform coefficients using the second transform basis. On the contrary, when the transform-basis adaptive selection mode is enabled, second transformer 1067 does not perform the second transform on the first transform coefficients. Specifically, second transformer 1067 skips the second transform when the transform-basis adaptive selection mode is enabled.

Internal Configuration of Inverse Transformer of Encoder

Figure 11B:
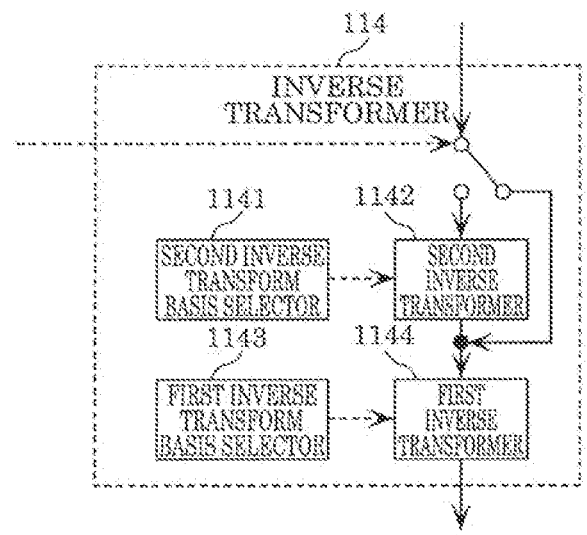
FIG. 11B is a block diagram illustrating an internal configuration of an inverse transformer of the encoder according to the first aspect of Embodiment 1.

The following describes an internal configuration of inverse transformer 114 of encoder 100 according to this aspect, with reference to FIG. 11B. FIG. 11B is a block diagram illustrating an internal configuration of inverse transformer 114 of encoder 100 according to the first aspect of Embodiment 1.

As illustrated in FIG. 11B, inverse transformer 114 according to this aspect includes second inverse transform basis selector 1141, second inverse transformer 1142, first inverse transform basis selector 1143, and first inverse transformer 1144.

When the transform-basis adaptive selection mode is disabled for the current block, second inverse transform basis selector 1141 selects, as a second inverse transform basis, an inverse transform basis of the second transform basis selected by second transform basis selector 1066.

When the transform-basis adaptive selection mode is disabled for the current block, second inverse transformer 1142 performs a second inverse transform on inverse quantization coefficients using the second inverse transform basis selected by second inverse transform basis selector 1141, to generate second inverse transform coefficients. The inverse quantization coefficient means a coefficient on which inverse quantizer 112 has performed inverse quantization.

First inverse transform basis selector 1143 selects, as first inverse transform bases, inverse transform bases of the first transform bases selected by first transform basis selector 1063.

When the transform-basis adaptive selection mode is disabled for the current block, first inverse transformer 1144 reconstructs residuals of the current block by performing a first inverse transform on the second inverse transform coefficients using the first inverse transform bases. On the other hand, when the transform-basis adaptive selection mode is enabled for the current block, first inverse transformer 1144 performs the first inverse transform on inverse quantization coefficients using the first inverse transform bases, to reconstruct residuals of the current block.

Processing Performed by Transformer and Quantizer of Encoder

Figure 12A:
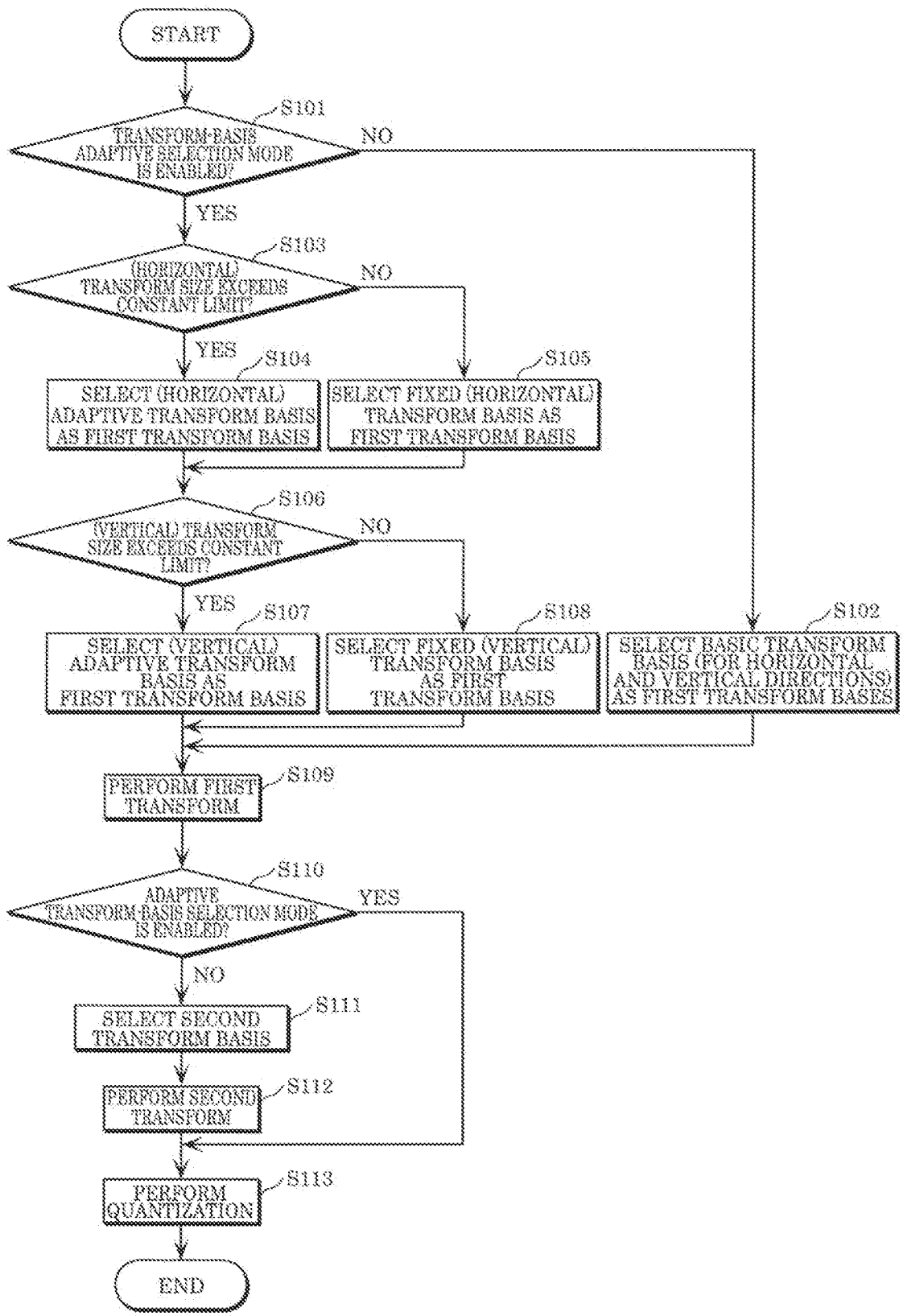
FIG. 12A is a flowchart illustrating processing performed by the transformer and a quantizer of the encoder according to the first aspect of Embodiment 1.

Next, processing performed by transformer r 106 having the configuration as above and also processing performed by quantizer 108 is to be described with reference to FIG. 12A. FIG. 12A is a flowchart illustrating processing performed by transformer 106 and quantizer 108 of encoder 100 according to the first aspect of Embodiment 1.

Transform mode determiner 1061 determines whether the transform-basis adaptive selection mode is enabled or disabled for the current block (S101).

When the transform-basis adaptive selection mode is disabled (NO in S101), first transform basis selector 1063 selects one basic transform basis as the first horizontal transform basis and the first vertical transform basis (S102).

When the transform-basis adaptive selection mode is enabled (YES in S101), size determiner 1062 determines whether the horizontal transform size exceeds a constant limit (S103). Specifically, size determiner 1062 determines whether the horizontal size of the current block is greater than the first horizontal threshold size.

When the horizontal transform size exceeds the constant limit (YES in S103), first transform basis selector 1063 selects a horizontal transform basis from among a plurality of adaptive transform bases, as the first horizontal transform basis (S104).

When the horizontal transform size is at or below the constant limit (NO in S103), first transform basis selector 1063 selects a fixed transform basis as the first horizontal transform basis (S105).

Next, size determiner 1062 determines whether the vertical transform size exceeds a constant limit (S106). Specifically, size determiner 1062 determines whether the vertical size of the current block is greater than the first vertical threshold size.

When the vertical transform size exceeds the constant limit (YES in S106), first transform basis selector 1063 selects a vertical transform basis from among a plurality of adaptive transform bases, as the first vertical transform basis (S107).

When the vertical transform size is at or below the constant limit (NO in S106), first transform basis selector 1063 selects a fixed transform basis as the first vertical transform basis (S108).

Note that the order of selecting horizontal and vertical transform bases may be the order of selecting the horizontal transform basis and then the vertical transform basis, and vice versa. The horizontal transform basis and the vertical transform basis may be selected simultaneously.

Using the first transform basis (bases) selected in step S102, S107, or S108, first transformer 1064 performs the first transform on prediction residuals, to generate first transform coefficients (S109).

Next, second transform determiner 1065 determines whether to perform the second transform on the first transform coefficients (S110). Here, second transform determiner 1065 determines, based on whether the transform-basis adaptive selection mode is enabled or disabled for the current block, whether to perform the second transform.

When the transform-basis adaptive selection mode is enabled (YES in S110), both selection of the second transform basis and the second transform are not performed, and quantizer 108 generates quantization coefficients by quantizing the first transform coefficients (S113). Specifically, steps S111 and S112 in FIG. 12A are skipped.

When the transform-basis adaptive selection mode is disabled (NO in S110), second transform basis selector 1066 selects a second transform basis from among one or more second transform basis candidates (S111). Second transformer 1067 performs the second transform on the first transform coefficients using the selected second transform basis, to generate the second transform coefficients (S112). Then, quantizer 108 generates quantization coefficients by quantizing the second transform coefficients (S113).

A predetermined transform basis can be used as the above basic transform basis. In this case, whether the transform-basis adaptive selection mode is enabled or disabled may be determined based on whether the first horizontal and vertical transform bases are each a predetermined transform basis. A single predetermined transform basis or two or more predetermined transform bases may be used.

When the second transform is not performed (skipped), the second transform may not be performed or a transform equivalent to omission of a transform may be performed as the second transform. In the former case, information indicating that the second transform is not to be performed may be encoded in a bitstream. In the latter case, information indicating a transform equivalent to omission of a transform may be encoded in a bitstream. Hereinafter, the same applies to processing of skipping such transforms.

Figure 12B:
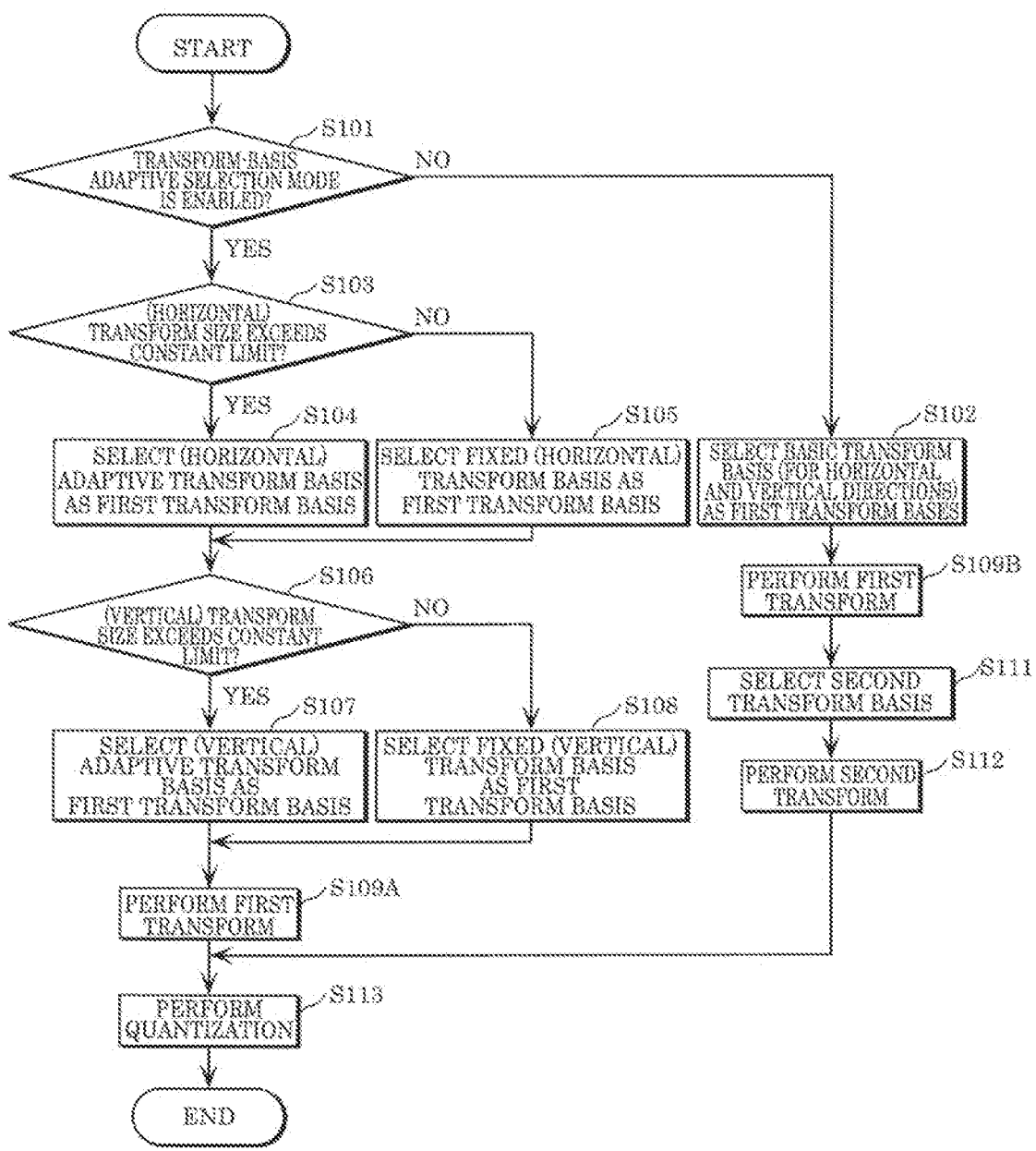
FIG. 12B is a flowchart illustrating a variation of processing performed by the transformer and the quantizer of the encoder according to the first aspect of Embodiment 1.

Note that the steps and the order of the steps, for instance, illustrated in FIG. 12A may be examples, and the present disclosure is not limited thereto. For example, as illustrated in FIG. 12B, determination of the transform-basis adaptive selection mode (S101) and determination as to whether to perform the second transform (S110) in FIG. 12A may be combined. FIG. 12B is a flowchart illustrating a variation of processing performed by transformer 106 and quantizer 108 of encoder 100 according to the first aspect of Embodiment 1. The flowchart in FIG. 12B is substantially equal to the flowchart in FIG. 12A.

In FIG. 12B, determination as to whether to perform the second transform (S110) is eliminated, and the first transform (S109) is split into two steps (S109A and S109B). In this case, transformer 106 of encoder 100 may not include second transform determiner 1065.

Inverse transformer 114 may select the second inverse transform basis and perform the second inverse transform, and may select the first inverse transform bases and perform the first inverse transform, in accordance with the transform by transformer 106 in FIG. 12A, and thus a description and illustration thereof are omitted.

Note that the first transform may be a frequency transform for which a transform basis can be adaptively selected, as the enhanced multiple transform (EMT) described in Non-Patent Literature (NPL) 2 (Jianle Chen et al., Algorithm Description of Joint Exploration Test Model 5 (JEM 5), Joint Video Exploration Team (JVET) of ITU-T SG 16 WP 3 and ISO/IEC JTC 1/SC 29/WG 11 5th Meeting: Geneva, CH, Document: JVET-E1001, January 2017) or a frequency transform for which transform bases are switched on certain conditions, or another typical transform. For example, a fixed transform basis may be set instead of selecting the first transform bases. A first transform basis that yields a result equivalent to omission of the first transform may be used. In the first transform, using identification information indicating which of the transform-basis adaptive selection mode and a fixed transform-basis mode in which a fixed basic transform basis (for example, a transform basis of the discrete cosine transform of type 2 (DCT-II)) is used is enabled, one of the two modes can be selected. In this case, it can also be determined using the identification information, which of the transform-basis adaptive selection mode and the fixed transform-basis mode is enabled for the current block. For example, in the EMT described in NPL 2, identification information (emt_cu_flag) indicating, per unit such as coding unit (CU), whether the transform-basis adaptive selection mode is enabled or disabled is present, and thus whether the transform-basis adaptive selection mode is enabled or disabled for the current block can be determined using such identification information.

Note that the second transform may be secondary transform processing such as non-separable secondary transform (NSST) described in NPL 2, may be a transform of switching between transform bases on certain conditions, or may be another typical transform. For example, a fixed transform basis may be set instead of selecting the second transform basis. A second transform basis that yields a result equivalent to omission of the second transform may be used. NSST may be a frequency space transform after DCT or DST, or may be, for example, Karhunen Loeve Transform (KLT) on transform coefficients of DCT or DST obtained offline or Hypercube-Givens Transform (HyGT) that expresses a basis equivalent to KLT and is expressed by a combination of rotational transforms.

Note that this processing is applicable to both of a luma signal and a chroma signal, and may be applied to each of R, G, and B signals if an input signal is in the RGB format. Furthermore, in the first transform or the second transform, bases that can be selected may be different for a luma signal and a chroma signal. For example, a luma signal has a broader frequency band than that of a chroma signal, and thus in order to perform an optimal transform, more types of bases may be used as candidates to be selected than those for a chroma signal in the first transform or the second transform on a luma signal. This processing is applicable in both intra processing and inter processing.

Advantageous Effects and Others

An optimal transform basis or transform coefficients (filter) is/are selected in the first transform (primary transform) and the second transform (secondary transform) described in NPL 2, so that optimal encoding efficiency as a whole is achieved. Accordingly, the first transform and the second transform need to be performed many times in order to search for an optimal combination of candidates for a transform basis and transform coefficients (filter) used for the first transform and the second transform. Thus, according to the transform method disclosed in NPL 2, an evaluation value is calculated for all the combinations of a candidate for a transform basis in the first transform and a candidate for a transform basis in the second transform, and a combination having the smallest evaluation value needs to be selected. Accordingly, the inventors of the present disclosure found out a problem that the amount of processing is huge with the transform method disclosed in NPL 2.

In view of this, encoder 100 according to this aspect skips the second transform based on whether the transform-basis adaptive selection mode is enabled or disabled, rather than performing both the first transform and the second transform all the times. Accordingly, encoder 100 can reduce the number of combinations of candidates for transform bases in the first transform and candidates for a transform basis in the second transform, and thus the amount of processing can be reduced.

According to encoder 100 according to this aspect, candidates for first transform bases can be limited based on conditions according to horizontal and vertical transform sizes. Accordingly, the amount of processing for searching for the most suitable first transform bases through trials can be reduced. In addition, the amount of processing for searching for the most suitable second transform basis through trials based on conditions such as bases selected as the first transform bases can be reduced. Furthermore, the amount of processing for trying combinations of the first transform and the second transform can be reduced.

As an example, the transform basis of DCT-II can be used as a basic transform basis. DCT-II is highly likely to be adopted if the residuals have a flat or random shape, and for example, if DCT-II is used as the first transform bases, concentration tends to be higher in a low-frequency region, and thus advantageous effects produced by the second transform can be increased. On the other hand, transform bases other than DCT-II readily leave high-frequency components, and advantageous effects produced by the second transform may decrease.

As an example, a transform basis of DST-VII can be used as a fixed transform basis selected when a transform size is at or below the constant limit. Particularly in intra processing, DST-VII is extremely highly likely to be selected when the residuals have an inclined shape and a small size.

Note that a basic transform basis is not limited to a single predetermined transform basis, and a plurality of predetermined transform bases may be each used as a basic transform basis.

Whether to perform selection of a second transform basis and the second transform or not may be switched according to the transform size. Further, a candidate for the second transform basis may be changed according to a transform size.

A configuration may be adopted in which only whether or not to perform the second transform is switched based on whether the transform-basis adaptive selection mode is enabled or disabled, and the first transform bases are not changed according to a transform size. Specifically, steps S103, S105, S106, and S108 may be eliminated from FIG. 12A. Here, whether the transform-basis adaptive selection mode is enabled or disabled may be determined based on identification information indicating use of that mode or the type of the first transform bases.

Similarly, a configuration may be adopted in which whether or not to perform the second transform is not switched based on whether the transform-basis adaptive selection mode is enabled or disabled, and only the first transform bases are changed according to a transform size. Specifically, step S110 may be eliminated from FIG. 12A.

Note that selection of the second transform basis and the second transform may not be skipped, irrespective of whether the transform-basis adaptive selection mode is enabled or disabled. Irrespective of the method of selecting the first transform bases, the second transform basis may be selected and the second transform may be performed when the transform-basis adaptive selection mode is disabled, and selection of the second transform basis and the second transform may be skipped when the transform-basis adaptive selection mode is enabled.

4, 8, 16, 32, or 64 pixels may be used as a specific threshold of a horizontal or vertical transform size (that is, the first horizontal threshold size and the first vertical threshold size) to determine whether to select a candidate from among adaptive transform bases or a fixed transform basis as the first transform bases.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Second Aspect of Embodiment 1

The following describes a second aspect of Embodiment 1. In this aspect, an example of encoding various signals regarding the first transform and the second transform according to the first aspect is to be described. The following specifically describes this aspect with reference to the drawings, focusing on differences from the first aspect.

Note that the internal configurations of transformer 106 and inverse transformer 114 of encoder 100 according to this aspect are the same as those of the first aspect, and thus illustration thereof is omitted.

Processing Performed by Transformer, Quantizer, and Entropy Encoder of Encoder

Figure 13A:
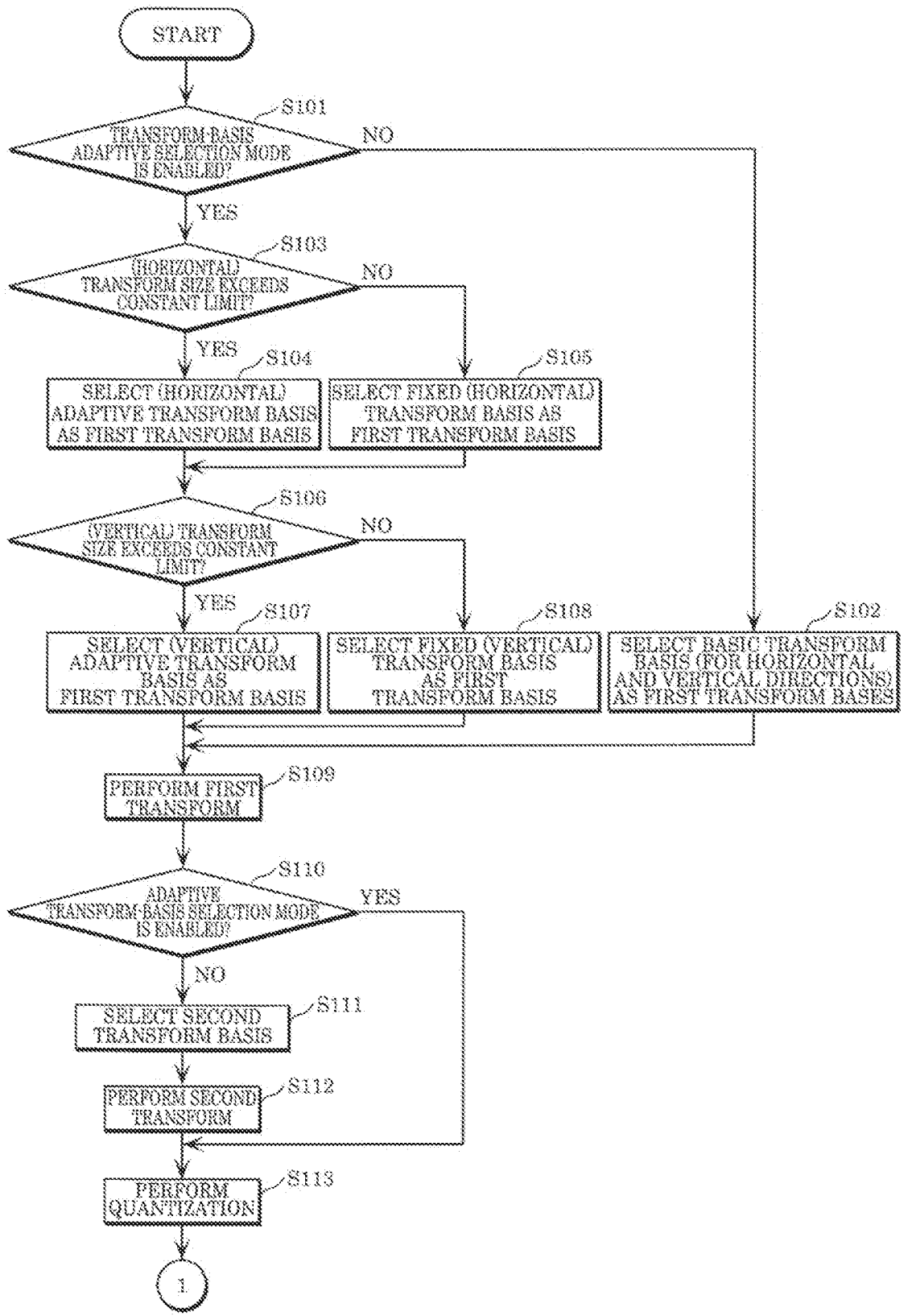
FIG. 13A is a flowchart illustrating processing performed by the transformer and the quantizer of the encoder according to a second aspect of Embodiment 1.
Figure 13B:
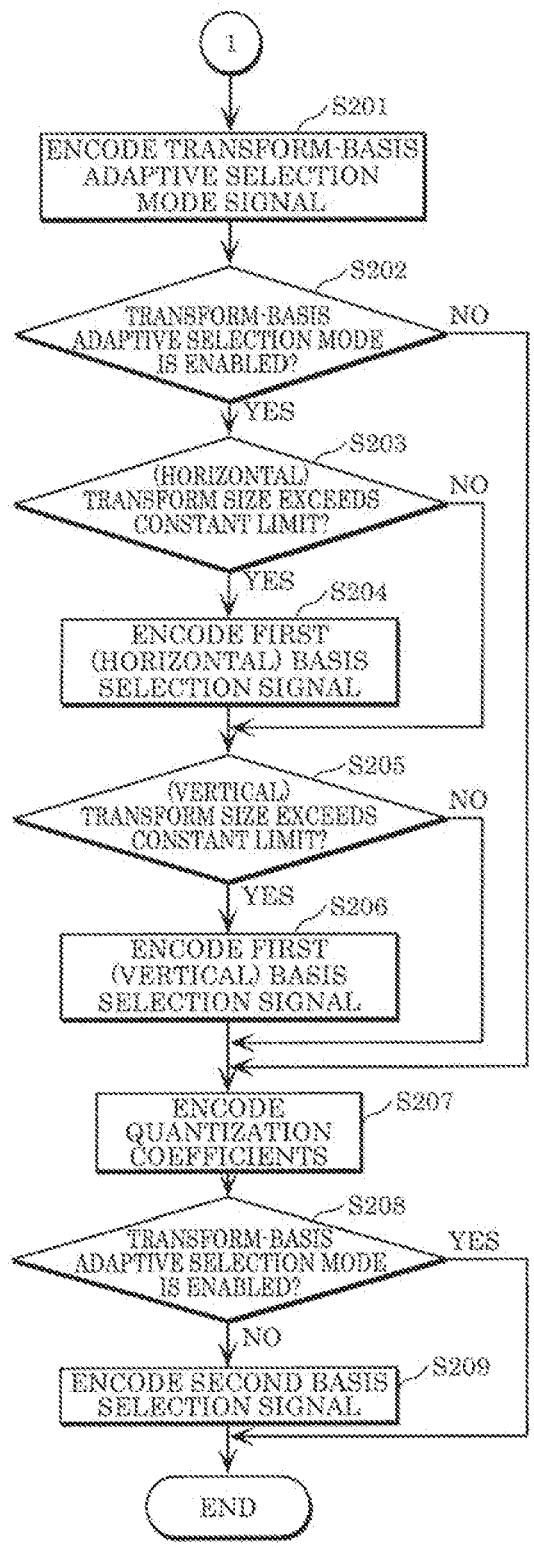
FIG. 13B is a flowchart illustrating processing performed by an entropy encoder of the encoder according to the second aspect of Embodiment 1.

Processing performed by transformer 106, quantizer 108, and entropy encoder 110 of encoder 100 according to this aspect is to be described with reference to FIG. 13A and FIG. 13B. FIG. 13A is a flowchart illustrating processing performed by transformer 106 and quantizer 108 of encoder 100 according to the second aspect of Embodiment 1. FIG. 13B is a flowchart illustrating processing performed by entropy encoder 110 of encoder 100 according to the second aspect of Embodiment 1. In FIG. 13A and FIG. 13B, the same numerals are given to the processing common to the first aspect, and thus a description thereof is omitted.

After quantization (S113), entropy encoder 110 encodes a transform-basis adaptive selection mode signal (S201). A transform-basis adaptive selection mode signal is an example of identification information of the transform-basis adaptive selection mode.

Then, if the transform-basis adaptive selection mode is enabled (YES in S202), when the horizontal transform size exceeds a constant limit (YES in S203), entropy encoder 110 encodes a first horizontal basis selection signal (S204). On the other hand, when the horizontal transform size is at or below the constant limit (NO in S203), entropy encoder 110 does not encode the first horizontal basis selection signal. Furthermore, when the vertical transform size exceeds the constant limit (YES in S205), entropy encoder 110 encodes a first vertical basis selection signal (S206). On the other hand, when the vertical transform size is at or below the constant limit, (NO in S205), entropy encoder 110 does not encode the first vertical basis selection signal.

When the transform-basis adaptive selection mode is disabled (NO in S202), encoding the first basis selection signal (S204, S206) is skipped.

Next, entropy encoder 110 encodes quantization coefficients (S207).

Here, when the transform-basis adaptive selection mode is disabled (NO in S208), entropy encoder 110 encodes a second basis selection signal (S209). On the other hand, when the transform-basis adaptive selection mode is enabled (YES in S208), encoding the second basis selection signal (S209) is skipped.

Note that the order of encoding signals may be determined in advance, and various signals may be encoded in the order different from the above encoding order.

When the second transform is not performed (skipped), a signal indicating that the second transform is not to be performed may be encoded, or a signal for selecting a second basis that yields a result equivalent to omission of the second transform may be encoded.

Syntax

Here, syntax in this aspect is to be described. FIG. 14 illustrates a specific example of syntax in the second aspect of Embodiment 1.

In FIG. 14, for example, if the transform-basis adaptive selection mode signal (emt_cu_flag) is set (in the fourth row), when the horizontal transform size (horizontal_tu_size) is greater than the first horizontal threshold size (horizontal_tu_size_th) (in the fifth row), the first horizontal basis selection signal (emt_horizontal_tridx) is encoded (in the sixth row). If the vertical transform size (vertical_tu_size) is greater than the first vertical threshold size (vertical_tu_size_th) (in the eleventh row), a first vertical basis selection signal (emt_vertical_tridx) is encoded (in the twelfth row). Under the other conditions (in the eighth row and the fourteenth row), encoding the first basis selection signal is skipped (in the ninth row and the fifteenth row).

When the transform-basis adaptive selection mode signal (emt_cu_flag) is not set (in the nineteenth row), the second basis selection signal (secondary_tridx) is encoded (in the twentieth row). On the contrary, when the transform-basis adaptive selection mode signal (emt_cu_flag) is set (in the twenty-second row), encoding the second basis selection signal (secondary_tridx) is skipped (in the twenty-third row).

Specific Examples of Transform Bases and Signals to be Encoded

Next, specific examples of transform bases and signals to be encoded are to be described. FIG. 15 illustrates specific examples of transform bases used in the second aspect of Embodiment 1 and whether to encode signals.

In FIG. 15, when the transform-basis adaptive selection mode is disabled, irrespective of the size of a current block to be encoded, the transform basis of DCT-II is used as the first horizontal transform basis and the first vertical transform basis. Stated differently, the transform basis of DCT-II is used as a basic transform basis. The second transform is performed (ON), and also the second basis selection signal (secondary_tridx) that indicates the second transform basis used in that second transform is encoded in a bitstream.

On the other hand, when the transform-basis adaptive selection mode is enabled, combinations of the transform basis of DST-VII and other transform bases (index0 to index3) are used as candidates for first horizontal and vertical transform bases, according to horizontal size H and vertical size V of the current block. The second transform is not performed (OFF), irrespective of the size of the current block. In addition, the second basis selection signal (secondary_tridx) is not encoded, but the transform-basis adaptive selection mode signal (emt_cu_flag) is encoded in a bitstream. Furthermore, when horizontal size H of the current block is greater than 4 pixels, the first horizontal basis selection signal (emt_horizontal_tridx) is encoded in the bitstream. When vertical size V of the current block is greater than 4 pixels, the first vertical basis selection signal (emt_vertical_tridx) is encoded in the bitstream.

For example, when horizontal size H is smaller than or equal to 4 pixels and vertical size V is smaller than or equal to 4 pixels, only the transform basis of DST-VII is used as a candidate for the first horizontal transform basis and the first vertical transform basis. At this time, the first horizontal basis selection signal and the first vertical basis selection signal (emt_horizontal_tridx and emt_vertical_tridx) are not encoded.

For example, when horizontal size H is smaller than or equal to 4 pixels and vertical size V is greater than 4 pixels, only the transform basis of DST-VII is used as a candidate for the first horizontal transform basis, and the transform basis of DST-VII and other transform bases are used as candidates for the first vertical transform basis. At this time, the first horizontal basis selection signal (emt_horizontal_tridx) is not encoded, yet the first vertical basis selection signal (emt_vertical_tridx) is encoded.

For example, when horizontal size H is greater than 4 pixels and vertical size V is smaller than or equal to 4 pixels, the transform basis of DST-VII and other transform bases are used as candidates for the first horizontal transform basis, and only the transform basis of DST-VII is used as a candidate for the first vertical transform basis. At this time, the first horizontal basis selection signal (emt_horizontal_tridx) is encoded, yet the first vertical basis selection signal (emt_vertical_tridx) is not encoded.

For example, when horizontal size H is greater than 4 pixels and vertical size V is greater than 4 pixels, the transform basis of DST-VII and other transform bases are used as candidates for the first horizontal transform basis and the first vertical transform basis. At this time, the first horizontal basis selection signal and the first vertical basis selection signal (emt_horizontal_tridx and emt_vertical_tridx) are encoded.

Advantageous Effects and Others

As described above, according to encoder 100 according to this aspect, only when the transform-basis adaptive selection mode is enabled, and furthermore the transform size exceeds the constant limit, information indicating the first transform bases (first basis selection signal) can be encoded, and the encoding amount for signaling the first transform bases can be reduced. Only when the transform-basis adaptive selection mode is disabled, information indicating the second transform basis (the second basis selection signal) can be encoded, and the encoding amount for signaling the second transform basis can be reduced. Information for determining whether to skip the second transform (such as a transform-basis adaptive selection mode signal) is encoded before the information indicating the second transform basis, and thus whether information indicating the second transform basis is encoded can be determined at the time of decoding.

Note that irrespective of the transform-basis adaptive selection mode, the second basis selection signal may be always encoded. Irrespective of the transform size, the first basis selection signal may be always encoded if the transform-basis adaptive selection mode is enabled. Whether to encode the first basis selection signal may be independently determined according to each of the horizontal size and the vertical size or may be determined in combination of the horizontal and vertical sizes.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Third Aspect of Embodiment 1

Next, a third aspect of Embodiment 1 is to be described. This aspect is different from the above first aspect in that when the transform-basis adaptive selection mode is disabled, a different basic transform basis is used as the first transform bases, according to the size of a current block to be encoded. The following specifically describes this aspect with reference to the drawings, focusing on differences from the first aspect and the second aspect.

Note that the internal configurations of transformer 106 and inverse transformer 114 of encoder 100 according to this aspect are the same as those in the first aspect, and thus illustration thereof is omitted.

Processing Performed by Transformer and Quantizer of Encoder

Figure 16:
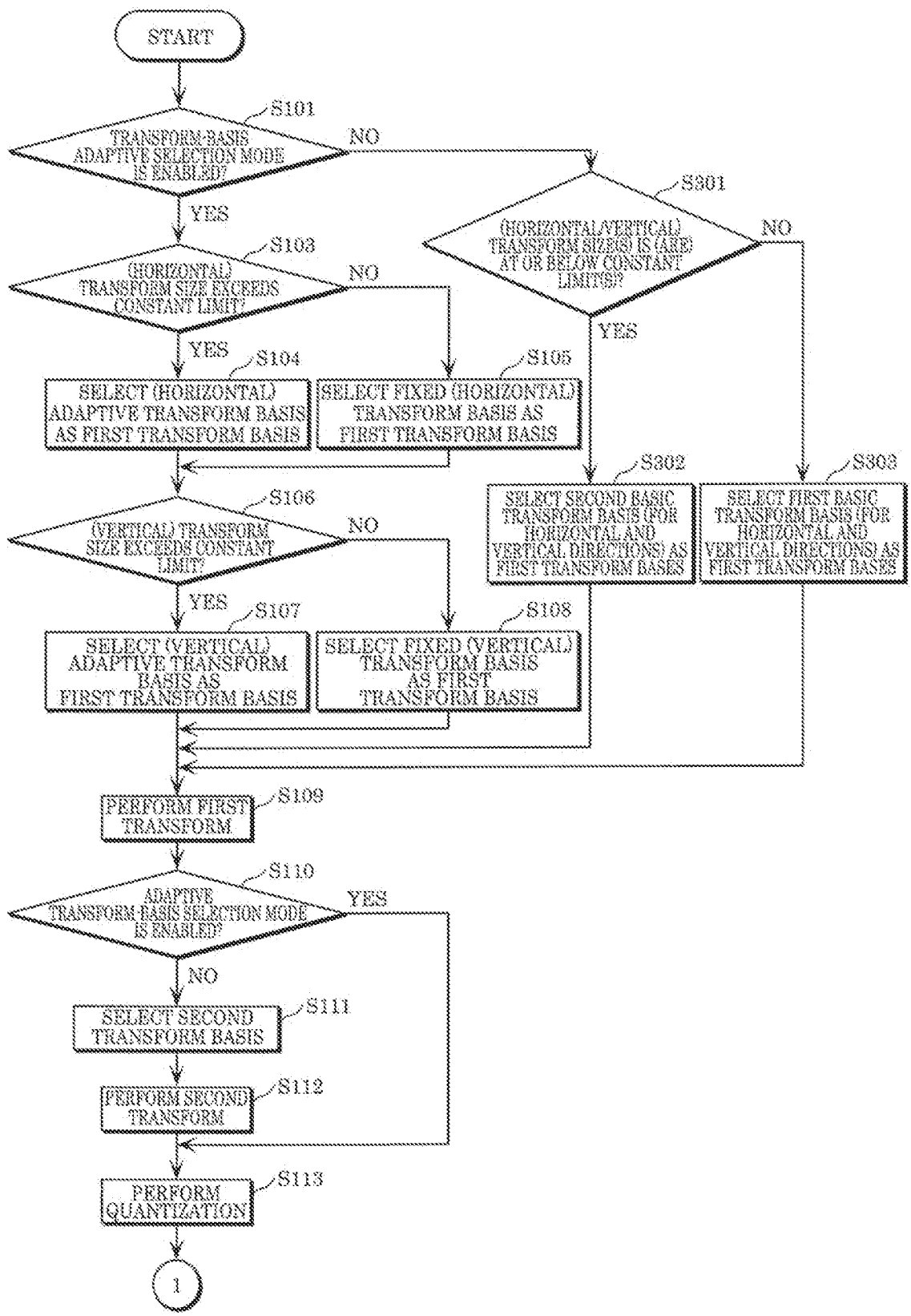
FIG. 16 is a flowchart illustrating processing performed by the transformer and the quantizer of the encoder according to a third aspect of Embodiment 1.

Processing performed by transformer 106 and quantizer 108 of encoder 100 according to this aspect is to be described with reference to FIG. 16. FIG. 16 is a flowchart illustrating processing performed by transformer 106 and quantizer 108 of encoder 100 according to the third aspect of Embodiment 1. In FIG. 16, the same numerals are given to the processes common to the processes in the first aspect, and thus description thereof is omitted.

When the transform-basis adaptive selection mode is disabled (NO in S101), size determiner 1062 determines whether the transform size is at or below a constant limit (S301). Specifically, size determiner 1062 determines whether the size of the current block is smaller than or equal to a second threshold size. For example, size determiner 1062 determines whether a product of the horizontal size and the vertical size of the current block is smaller than or equal to a threshold, thus determining whether the size of the current block is smaller than or equal to the second threshold size.

Here, when the transform size is at or below the constant limit (YES in S301), first transform basis selector 1063 selects a second basic transform basis as the first horizontal transform basis and the first vertical transform basis (S302). On the other hand, when the transform size exceeds the constant limit (NO in S301), first transform basis selector 1063 selects a first basic transform basis as the first horizontal transform basis and the first vertical transform basis (S303).

As an example, the transform basis of DCT-II can be used as the first basic transform basis, and the transform basis of DST-VII can be used as the second basic transform basis.

Note that the basic transform basis may be selected from among basic transform basis candidates.

Note that selection of the second transform basis and the second transform may not be skipped irrespective of whether the transform-basis adaptive selection mode is enabled or disabled. Irrespective of the method of selecting the first transform bases, when the transform-basis adaptive selection mode is disabled, the second transform basis is selected and the second transform is performed, and when the transform-basis adaptive selection mode is enabled, selection of the second transform basis and the second transform may be skipped.

When the transform-basis adaptive selection mode is disabled, the 4×4, 4×8, 8×4, 8×8 pixel sizes, for example, can be used as a second threshold size for selecting one of the first basic transform basis and the second basic transform basis. As the transform size compared with a threshold, the product of the horizontal size and the vertical size of the current block may be used as in this aspect, or the horizontal size and the vertical size may be individually used.

Note that when the transform-basis adaptive selection mode is disabled, if the product of the horizontal size and the vertical size is at or below the constant limit, the second basic transform basis is selected as the first horizontal transform basis and the first vertical transform basis, and selection of the second transform basis and the second transform may be skipped.

Advantageous Effects and Others

As described above, according to encoder 100 according to this aspect, when the transform-basis adaptive selection mode is disabled, the first transform bases can be switched between the first basic transform basis and the second basic transform basis according to a transform size. Accordingly, the first transform can be performed using the first transform bases associated with the transform size, and thus the encoding amount can be reduced.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Fourth Aspect of Embodiment 1

Next, a fourth aspect of Embodiment 1 is to be described. In this aspect, an example of encoding various signals regarding the first transform and the second transform according to the third aspect is to be described. The following specifically describes this aspect with reference to the drawings, focusing on differences from the first to third aspects.

Note that the internal configurations of transformer 106 and inverse transformer 114 of encoder 100 according to this aspect are the same as those of the first aspect, and thus illustration thereof is omitted.

Figure 17A:
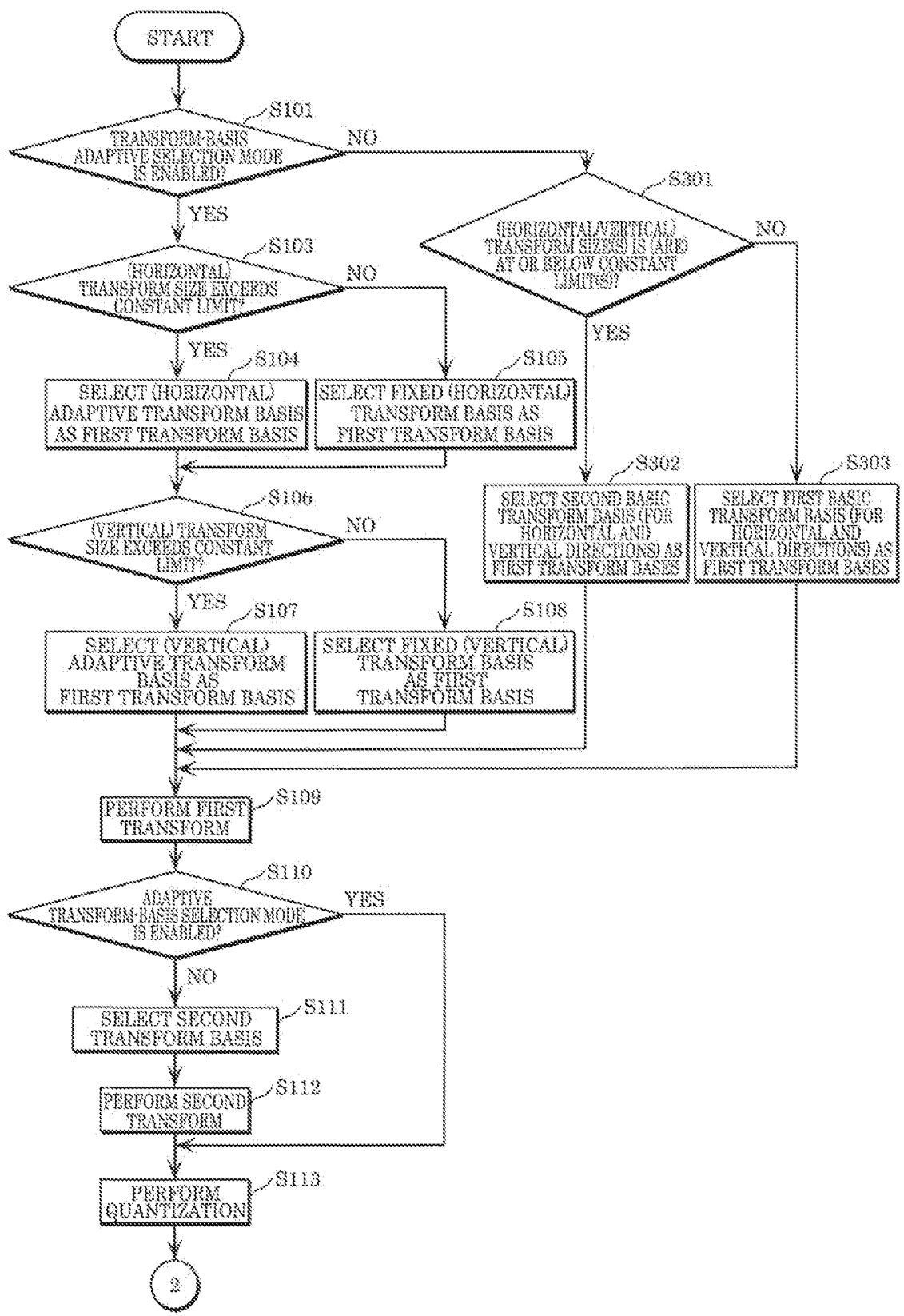
FIG. 17A is a flowchart illustrating processing performed by the transformer and the quantizer of the encoder according to a fourth aspect of Embodiment 1.
Figure 17B:
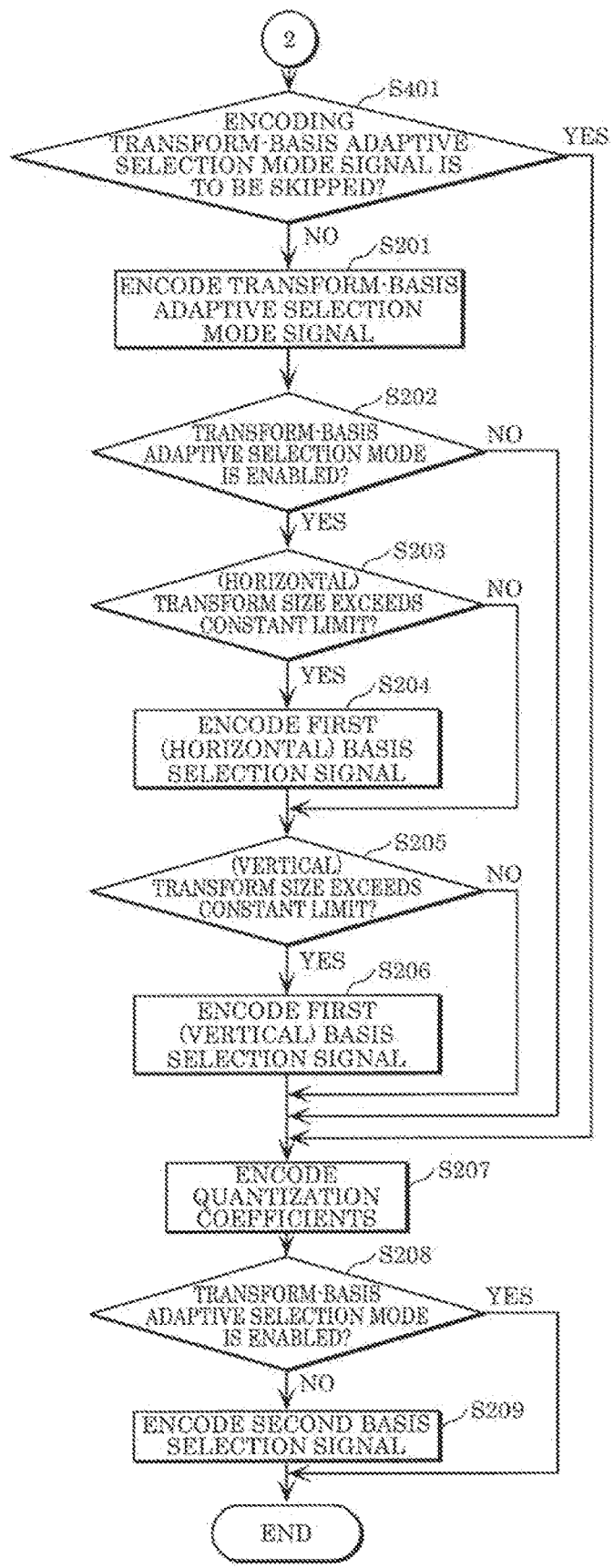
FIG. 17B is a flowchart illustrating processing performed by the entropy encoder of the encoder according to the fourth aspect of Embodiment 1.

Processing Performed by Transformer, Quantizer, and Entropy Encoder of Encoder Processing performed by transformer 106, quantizer 108, and entropy encoder 110 of encoder 100 according to this aspect is to be described with reference to FIG. 17A and FIG. 17B. FIG. 17A is a flowchart illustrating processing performed by transformer 106 and quantizer 108 of encoder 100 according to the fourth aspect of Embodiment 1. FIG. 17B is a flowchart illustrating processing performed by entropy encoder 110 of encoder 100 according to the fourth aspect of Embodiment 1. In FIG. 17A and FIG. 17B, the same numerals are given to the processes common to those in any of the first to third aspects, and thus description thereof is omitted.

After performing quantization (S113), entropy encoder 110 determines whether to skip encoding a transform-basis adaptive selection mode signal (S401). For example, if one of conditions (A) and (B) as below is satisfied, entropy encoder 110 determines to skip encoding a transform-basis adaptive selection mode signal, and if not, determines not to skip encoding a transform-basis adaptive selection mode signal.

(A) The transform-basis adaptive selection mode is disabled.

(B) The transform-basis adaptive selection mode is enabled, and furthermore all the following conditions (B1) to (B4) are satisfied.

(B1) The transform size is smaller than or equal to second threshold size W1×H1 used in step S301.
(B2) The horizontal transform size is smaller than first horizontal threshold size W2 used in step S103.
(B3) The vertical transform size is smaller than first vertical threshold size H2 used in step S106.
(B4) The second basic transform basis is the same as a fixed horizontal transform basis and a fixed vertical transform basis.

As a specific example, when second threshold size W1×H1 is 4×4 pixels, first horizontal threshold size W2 is 4 pixels, first vertical threshold size H2 is 4 pixels, and the second basic transform basis and the fixed transform bases are all transform bases of DST-VII, if the transform size is smaller than or equal to 4×4 pixels, entropy encoder 110 determines to skip encoding the transform-basis adaptive selection mode signal.

On the contrary, when both conditions (A) and (B) above are not satisfied, entropy encoder 110 determines not to skip encoding the transform-basis adaptive selection mode signal.

Here, when entropy encoder 110 determines to skip encoding the transform-basis adaptive selection mode signal (YES in S401), entropy encoder 110 skips steps S201 to S206, and encodes quantization coefficients (S207). On the other hand, when entropy encoder 110 determines not to skip encoding the transform-basis adaptive selection mode signal (NO in S401), entropy encoder 110 encodes quantization coefficients after performing steps S201 to S206 (S207), similarly to the second aspect.

Note that the order of encoding the above may be determined in advance, and various signals may be encoded in the order different from the above encoding order.

Syntax

Here, syntax according to this aspect is to be described. FIG. 18 illustrates a specific example of syntax in the fourth aspect of Embodiment 1.

For example, in FIG. 18, when encoding the transform-basis adaptive selection mode signal is skipped (in the twentieth row), encoding the transform-basis adaptive selection mode signal (emt_cu_flag) and the first basis selection signals (emt_horizontal_tridx and emt_vertical_tridx) is skipped (in the twenty-first row). Here, when the horizontal transform size (horizontal_tu_size) is smaller than or equal to the first horizontal threshold size (horizontal_tu_size_th) and furthermore, the vertical transform size (vertical_tu_size) is smaller than or equal to the first vertical threshold size (vertical_tu_size_th), encoding the transform-basis adaptive selection mode signal is skipped. When encoding the transform-basis adaptive selection mode signal is not skipped (in the third and fourth rows), the transform-basis adaptive selection mode signal (emt_cu_flag) is encoded (in the fifth row), the first basis selection signals (emt_horizontal_tridx and emt_vertical_tridx) are encoded if necessary (in the seventh to sixteenth rows), similarly to the second aspect.

Note that when encoding the transform-basis adaptive selection mode signal is skipped, selection of the second transform basis and the second transform may be skipped.

Specific Examples of Transform Bases and Signals to be Encoded

Next, specific examples of transform bases and signals to be encoded are to be described. FIG. 19 illustrates specific examples of transform bases used in the fourth aspect of Embodiment 1 and whether to encode signals. When the horizontal size and the vertical size of a current block to be encoded are both smaller than or equal to 4 pixels, transform bases and whether to encode signals in FIG. 19 are different from those in FIG. 15. FIG. 19 is to be described, focusing on differences from FIG. 15.

In FIG. 19, when the transform-basis adaptive selection mode is disabled, if both horizontal size H and vertical size V of the current block are smaller than or equal to 4 pixels, not the transform basis of DCT-II, but the transform basis of DST VII is used as the first horizontal transform basis and the first vertical transform basis.

When the transform-basis adaptive selection mode is enabled, if both horizontal size H and vertical size V of the current block are smaller than or equal to 4 pixels, the transform-basis adaptive selection mode signal (emt_cu_flag) is not encoded.

Advantageous Effects and Others

As described above, according to encoder 100 according to this aspect, when the conditions to skip encoding the transform-basis adaptive selection mode signal are satisfied, encoding the transform-basis adaptive selection mode signal and the first basis selection signal can be entirely omitted, and the encoding amount can be reduced.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Fifth Aspect of Embodiment 1

Next, a fifth aspect of Embodiment 1 is to be described. This aspect gives description of a decoder. Note that the decoder according to this aspect corresponds to the encoder according to the first aspect described above. Specifically, the decoder according to this aspect can decode a bitstream encoded by the encoder according to the first aspect described above. The following specifically describes this aspect with reference to the drawings.

Internal Configurations of Transformer and Inverse Transformer of Decoder

Figure 20:
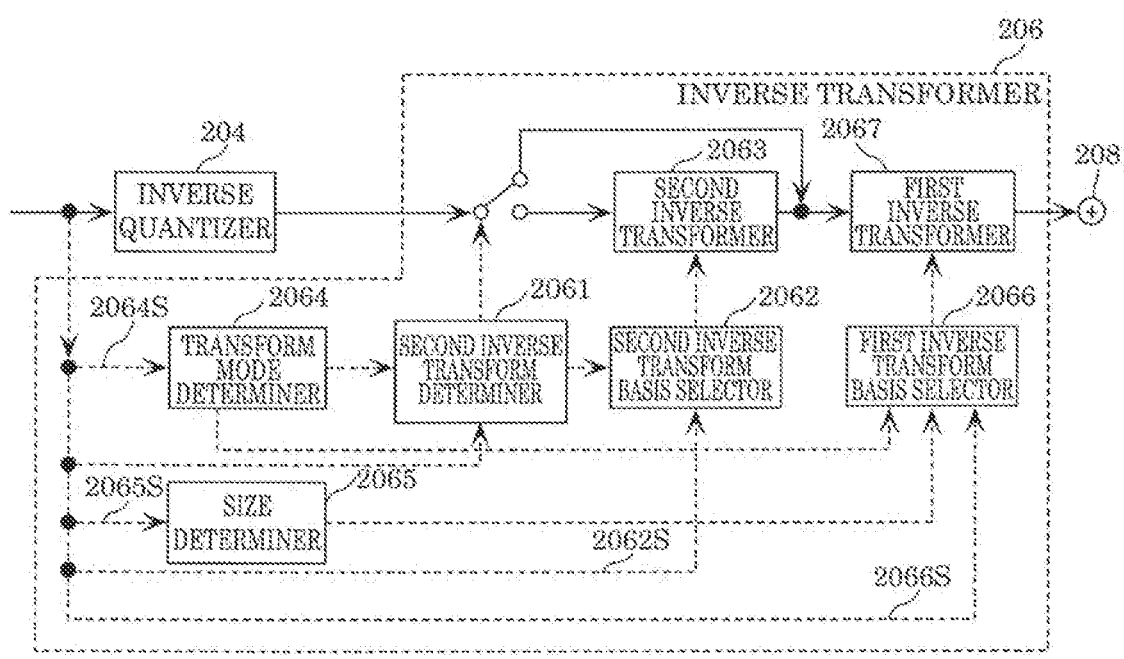
FIG. 20 is a block diagram illustrating an internal configuration of an inverse transformer of the decoder according to a fifth aspect of Embodiment 1.

First, the internal configuration of inverse transformer 206 of decoder 200 according to this aspect is to be described. FIG. 20 is a block diagram illustrating an internal configuration of inverse transformer 206 of decoder 200 according to the fifth aspect of Embodiment 1.

As illustrated in FIG. 20, inverse transformer 206 according to this aspect includes second inverse transform determiner 2061, second inverse transform basis selector 2062, second inverse transformer 2063, transform mode determiner 2064, size determiner 2065, first inverse transform basis selector 2066, and first inverse transformer 2067.

Based on whether the transform-basis adaptive selection mode is enabled or disabled for a current block to be decoded, second inverse transform determiner 2061 determines whether to perform second inverse transform on inverse quantization coefficients of the current block output from inverse quantizer 204. Specifically, second inverse transform determiner 2061 determines that the second inverse transform is to be performed when the transform-basis adaptive selection mode is disabled, and that the second inverse transform is not to be performed when the transform-basis adaptive selection mode is enabled.

Second inverse transform basis selector 2062 selects the second inverse transform basis when second inverse transform determiner 2061 has determined that the second inverse transform is to be performed. Specifically, second inverse transform basis selector 2062 obtains second basis selection signal 2062S decoded by entropy decoder 202 from a bitstream and indicating the second inverse transform basis when the transform-basis adaptive selection mode is disabled. Then, second inverse transform basis selector 2062 selects the second inverse transform basis, based on second basis selection signal 2062S. On the contrary, second inverse transform basis selector 2062 does not select the second inverse transform basis when the transform-basis adaptive selection mode is enabled. Specifically, second inverse transform basis selector 2062 skips selection of the second inverse transform basis when the transform-basis adaptive selection mode is enabled.

When second inverse transform determiner 2061 has determined that the second inverse transform is to be performed, second inverse transformer 2063 performs the second inverse transform on inverse quantization coefficients of the current block, using the second inverse transform basis selected by second inverse transform basis selector 2062. Specifically, when the transform-basis adaptive selection mode is disabled, second inverse transformer 2063 performs the second inverse transform on inverse quantization coefficients using the second inverse transform basis, to generate the second inverse transform coefficients. On the contrary, second inverse transformer 2063 does not perform the second inverse transform on inverse quantization coefficients when the transform-basis adaptive selection mode is enabled. Specifically, second inverse transformer 2063 skips the second inverse transform when the transform-basis adaptive selection mode is enabled.

Transform mode determiner 2064 determines whether the transform-basis adaptive selection mode is enabled or disabled for the current block. Whether the transform-basis adaptive selection mode is enabled or disabled is determined based on first basis selection signal 2066S or transform-basis adaptive selection mode signal 2064S decoded by entropy decoder 202 from a bitstream. Specifically, the determination is made based on the first inverse transform bases or the identification information of the transform-basis adaptive selection mode.

Size determiner 2065 determines whether the horizontal size of the current block is greater than a first horizontal threshold size. Size determiner 1062 determines whether the vertical size of the current block is greater than a first vertical threshold size. Determination regarding the horizontal size and the vertical size is based on size signal 2065S decoded by entropy decoder 202 from a bitstream.

First inverse transform basis selector 2066 selects the first inverse transform bases. Specifically, when the transform-basis adaptive selection mode is disabled, first inverse transform basis selector 2066 selects one basic transform basis as a first horizontal inverse transform basis and a first vertical inverse transform basis. When the transform-basis adaptive selection mode is enabled, first inverse transform basis selector 2066 selects, based on the horizontal size and the vertical size of the current block, the first horizontal and vertical inverse transform bases as in (1) to (4) below.

(1) When the horizontal size of the current block is greater than the first horizontal threshold size, first inverse transform basis selector 2066 obtains first basis selection signal 2066S decoded by entropy decoder 202 from the bitstream, and indicating the first inverse transform bases. Then, first inverse transform basis selector 2066 selects the first horizontal inverse transform basis based on first basis selection signal 2066S.

(2) When the horizontal size of the current block is smaller than or equal to the first horizontal threshold size, first inverse transform basis selector 2066 selects a fixed horizontal transform basis as the first horizontal inverse transform basis.

(3) When the vertical size of the current block is greater than the first vertical threshold size, first inverse transform basis selector 2066 obtains first basis selection signal 2066S. Then, first inverse transform basis selector 2066 selects the first vertical inverse transform basis, based on first basis selection signal 2066S.

(4) When the vertical size of the current block is smaller than or equal to the first vertical threshold size, first inverse transform basis selector 2066 selects a fixed vertical transform basis as the first vertical inverse transform basis.

First inverse transformer 2067 performs the first inverse transform on inverse quantization coefficients of the current block using the first inverse transform bases selected by first inverse transform basis selector 2066, to restore residuals of the current block. Specifically, first inverse transformer 2067 performs the first horizontal inverse transform using the first horizontal inverse transform basis, and performs the first vertical inverse transform using the first vertical inverse transform basis.

Processing Performed by Inverse Quantizer and Inverse Transformer of Decoder

Figure 21:
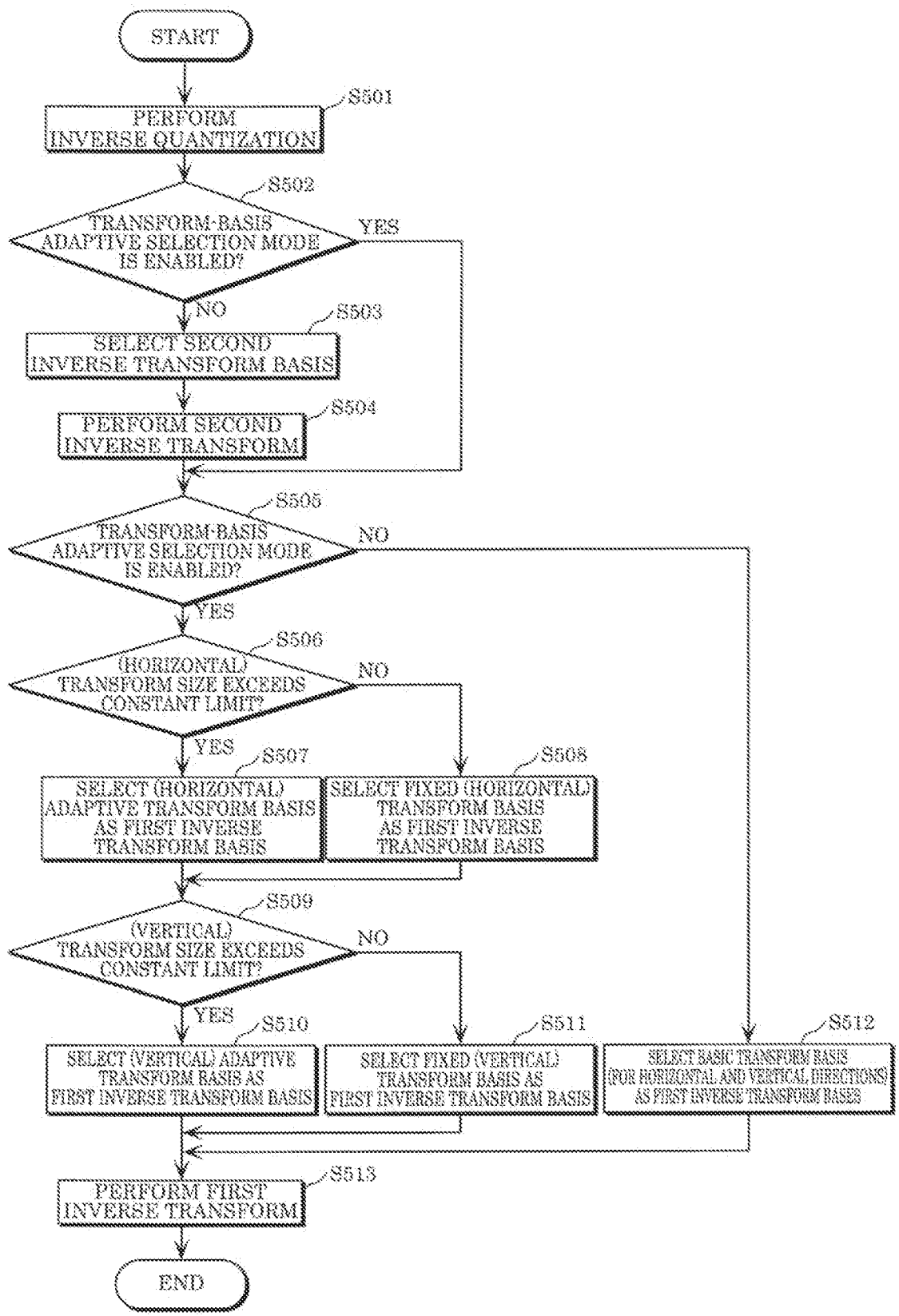
FIG. 21 is a flowchart illustrating processing performed by an inverse quantizer and an inverse transformer of the decoder according to the fifth aspect of Embodiment 1.

Next, processing performed by inverse transformer 206 having a configuration as above is to be described together with processing performed by inverse quantizer 204 with reference to FIG. 21. FIG. 21 is a flowchart illustrating processing performed by inverse quantizer 204 and inverse transformer 206 of decoder 200 according to the fifth aspect of Embodiment 1.

Inverse quantizer 204 generates inverse quantization coefficients by performing inverse quantization on quantization coefficients of the current block decoded by entropy decoder 202 (S501).

Second inverse transform determiner 2061 determines whether to perform the second inverse transform on inverse quantization coefficients (S502). Here, second inverse transform determiner 2061 determines whether to perform the second inverse transform, based on whether the transform-basis adaptive selection mode is enabled or disabled for the current block.

Here, when the transform-basis adaptive selection mode is enabled (YES in S502), the second inverse transform basis is not selected and the second inverse transform is not performed. In other words, steps S503 and S504 are skipped.

On the other hand, when the transform-basis adaptive selection mode is disabled (NO in S502), second inverse transform basis selector 2062 selects the second inverse transform basis, based on second basis selection signal 2062S (S503). Furthermore, second inverse transformer 2063 performs the second inverse transform on inverse quantization coefficients, using the selected second inverse transform basis (S504).

Next, transform mode determiner 2064 determines whether the transform-basis adaptive selection mode is enabled or disabled for the current block (S505). For example, transform mode determiner 2064 determines whether the transform-basis adaptive selection mode is enabled or disabled, based on transform-basis adaptive selection mode signal 2064S.

When the transform-basis adaptive selection mode is disabled (NO in S505), first inverse transform basis selector 2066 selects one basic transform basis as a first horizontal inverse transform basis and a first vertical inverse transform basis (S512). On the other hand, when the transform-basis adaptive selection mode is enabled (YES in S505), size determiner 2065 determines whether the horizontal transform size exceeds a constant limit (S506). Specifically, size determiner 2065 determines whether the horizontal size of the current block is greater than the first horizontal threshold size.

When the horizontal transform size exceeds the constant limit (YES in S506), first inverse transform basis selector 2066 selects a horizontal transform basis from among a plurality of adaptive transform bases, as the first horizontal inverse transform basis (S507). On the other hand, when the horizontal transform size is at or below the constant limit (NO in S506), first inverse transform basis selector 2066 selects a fixed transform basis as the first horizontal inverse transform basis (S508).

Size determiner 2065 determines whether the vertical transform size exceeds a constant limit (S509). Specifically, size determiner 2065 determines whether the vertical size of the current block is greater than the first vertical threshold size.

When the vertical transform size exceeds the constant limit (YES in S509), first inverse transform basis selector 2066 selects a transform basis from among a plurality of adaptive transform bases as the first vertical inverse transform basis (S510). When the vertical transform size is at or below the constant limit (NO in S509), first inverse transform basis selector 2066 selects a fixed transform basis as the first vertical inverse transform basis (S511).

First inverse transformer 2067 performs the first inverse transform on the inverse quantization coefficients or the second inverse transform coefficients using the first inverse transform bases selected as described above, to restore the residuals of the current block (S513).

Note that the order of selecting the horizontal and vertical inverse transform bases may be the order of selecting the horizontal inverse transform basis and then the vertical inverse transform basis, and vice versa. The horizontal inverse transform basis and the vertical inverse transform basis may be selected simultaneously.

Note that selecting inverse transform bases in decoder 200 means decoding information that indicates bases used for inverse transform and that is included in an encoded bitstream and determining inverse transform bases based on the decoded information, or means determining inverse transform bases that are uniquely indicated based on information indicating an intra prediction mode, the size of the current block, or bases in the first inverse transform.

Note that a decoding method consistent with the encoding method according to the first aspect illustrated in FIG. 12A or FIG. 12B may be adopted.

Advantageous Effects and Others

As described above, decoder 200 according to this aspect can yield similar advantageous effects to those achieved by encoder 100 according to the first aspect.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Sixth Aspect of Embodiment 1

Next, a sixth aspect of Embodiment 1 is to be described. In this aspect, an example of decoding various signals regarding the first transform and the second transform in the fifth aspect is to be described. Note that a decoder according to this aspect corresponds to the encoder according to the second aspect described above. The following specifically describes this aspect with reference to the drawings, focusing on differences from the fifth aspect.

Note that an internal configuration of inverse transformer 206 of decoder 200 according to this aspect is the same as that of the fifth aspect, and thus illustration thereof is omitted.

Figure 22A:
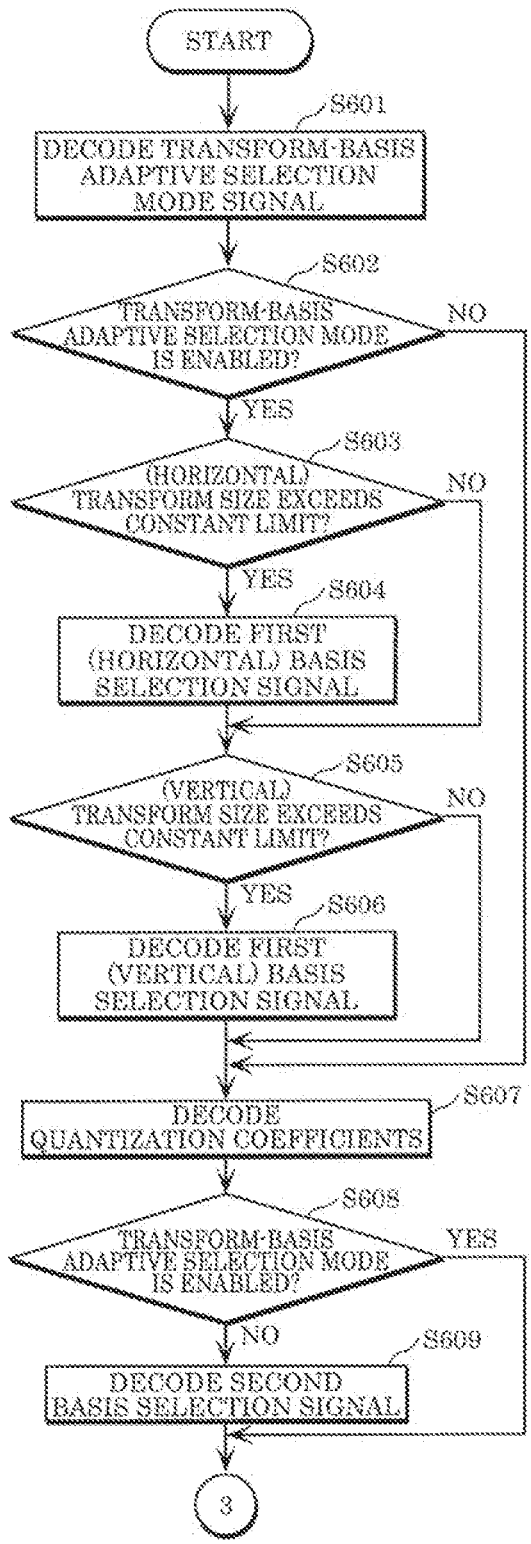
FIG. 22A is a flowchart illustrating processing performed by an entropy decoder of the decoder according to a sixth aspect of Embodiment 1.
Figure 22B:
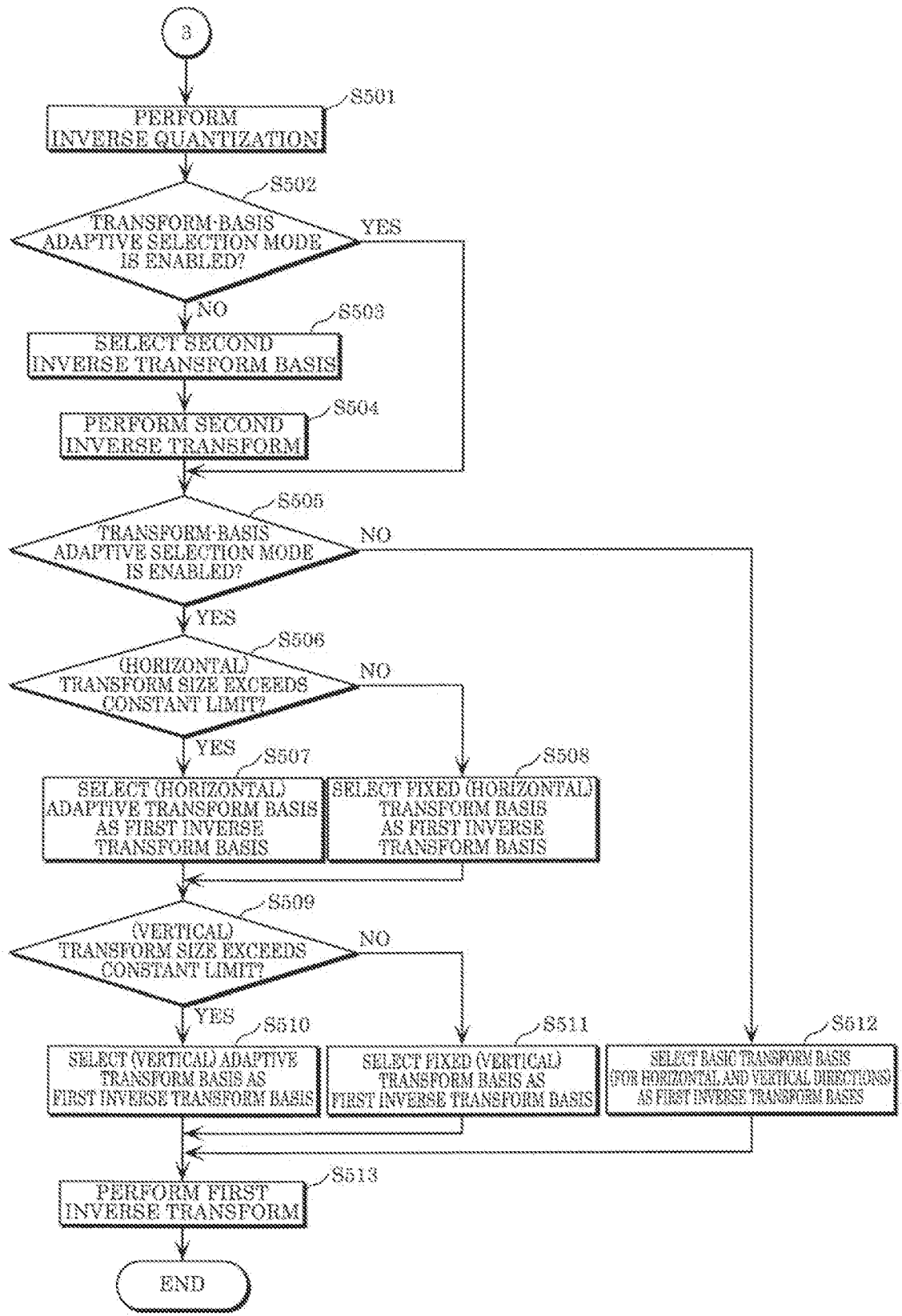
FIG. 22B is a flowchart illustrating processing performed by the inverse quantizer and the inverse transformer of the decoder according to the sixth aspect of Embodiment 1.

Processing Performed by Entropy Decoder, Inverse Quantizer, and Inverse Transformer of Decoder Processing performed by entropy decoder 202, inverse quantizer 204, and inverse transformer 206 of decoder 200 according to this aspect is to be described with reference to FIG. 22A and FIG. 22B. In FIG. 22A and FIG. 22B, the same numerals are given to the processing common to the fifth aspect, and description thereof is omitted.

First, entropy decoder 202 decodes a transform-basis adaptive selection mode signal from a bitstream (S601). Then, transform mode determiner 2064 determines whether the transform-basis adaptive selection mode is enabled or disabled for a current block to be decoded, based on a transform-basis adaptive selection mode signal (S602).

If the transform-basis adaptive selection mode is enabled (YES in S602), when the horizontal transform size exceeds a constant limit (YES in S603), entropy decoder 202 decodes a first horizontal basis selection signal from the bitstream (S604). On the other hand, when the horizontal transform size is at or below the constant limit (NO in S603), entropy decoder 202 does not decode a first horizontal basis selection signal. Furthermore, when the vertical transform size exceeds a constant limit (YES in S605), entropy decoder 202 decodes a first vertical basis selection signal from the bitstream (S606). On the other hand, when the vertical transform size is at or below the constant limit (NO in S605), entropy decoder 202 does not decode the first vertical basis selection signal.

When the transform-basis adaptive selection mode is disabled (NO in S602), decoding first basis selection signals (S604, S606) is skipped.

Next, entropy decoder 202 decodes quantization coefficients (S607).

Here, when the transform-basis adaptive selection mode is disabled (NO in S608), entropy decoder 202 decodes the second basis selection signal from the bitstream (S609). On the other hand, when the transform-basis adaptive selection mode is enabled (YES in S608), decoding the second basis selection signal (S609) is skipped.

The order of decoding signals may be determined in advance as well as the encoding method, and various signals may be decoded in the order different from the above order of decoding signals. When the second inverse transform is not performed (is skipped), entropy decoder 202 may decode, from the bitstream, a signal indicating that the second inverse transform is not to be performed, or a signal for selecting a second inverse transform basis that yields a result equivalent to omission of the transform may be decoded from the bitstream.

Note that the decoding method consistent with the encoding method according to the second aspect illustrated in FIG. 13A, FIG. 13B, and FIG. 14 may be adopted.

Advantageous Effects and Others

As described above, decoder 200 according to this aspect can yield similar advantageous effects to those achieved by encoder 100 according to the second aspect.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Seventh Aspect of Embodiment 1

Next, a seventh aspect of Embodiment 1 is to be described. This aspect is different from the fifth aspect above in that when the transform-basis adaptive selection mode is disabled, a different basic transform basis is used as the first inverse transform bases, according to the size of a current block to be decoded. Note that the decoder according to this aspect corresponds to the encoder according to the third aspect described above. The following specifically describes this aspect with reference to the drawings, focusing on differences from the fifth aspect and the sixth aspect.

Note that the internal configuration of inverse transformer 206 of decoder 200 according to this aspect is the same as that of the fifth aspect, and thus illustration thereof is omitted.

Processing Performed by Inverse Quantizer and Inverse Transformer of Decoder

Figure 23:
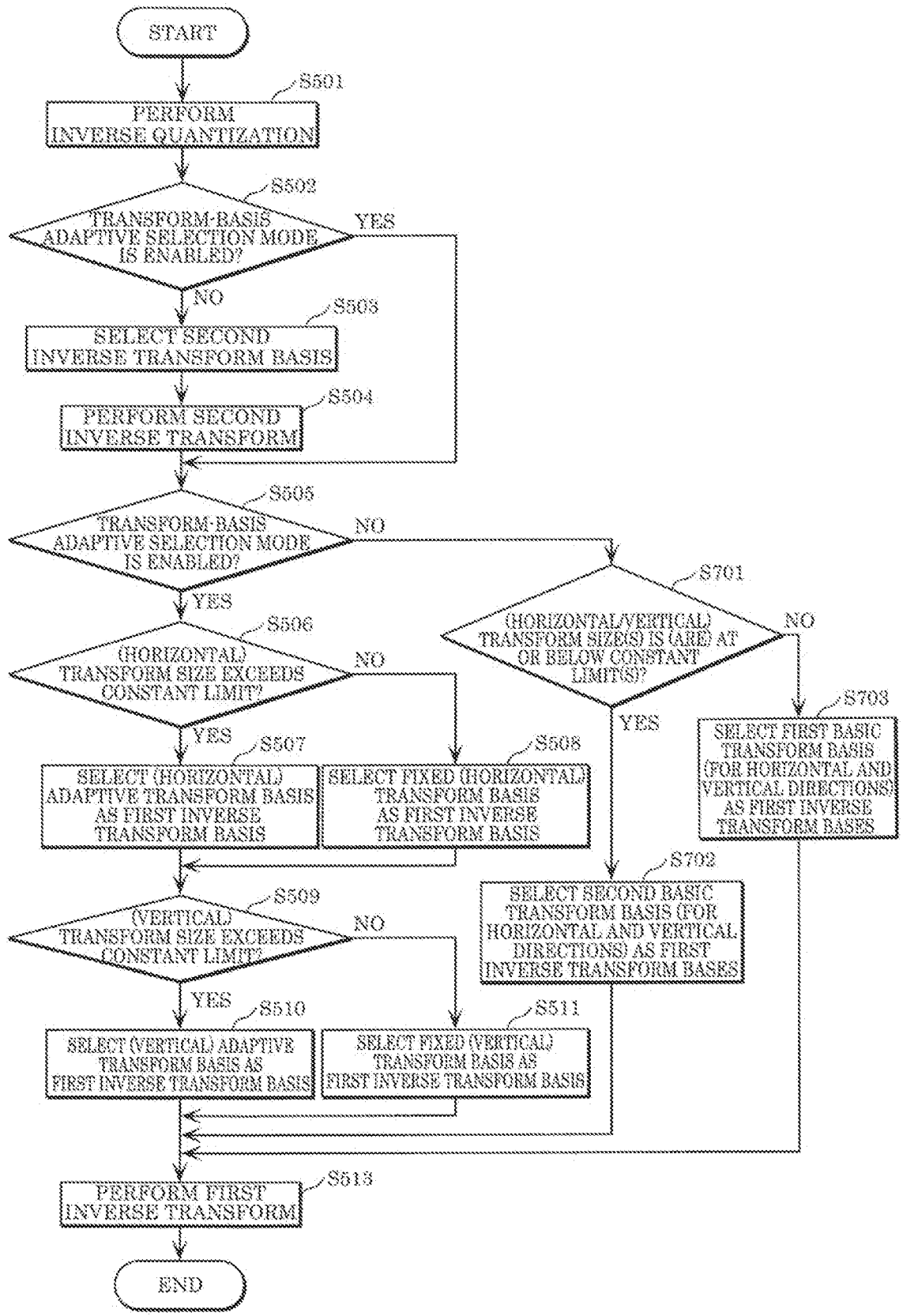
FIG. 23 is a flowchart illustrating processing performed by the inverse quantizer and the inverse transformer of the decoder according to a seventh aspect of Embodiment 1.

The processing performed by inverse quantizer 204 and inverse transformer 206 of decoder 200 according to this aspect is to be described with reference to FIG. 23. FIG. 23 is a flowchart illustrating processing performed by inverse quantizer 204 and inverse transformer 206 of decoder 200 according to the seventh aspect of Embodiment 1. In FIG. 23, the same numerals are given to the processes common to those in the fifth aspect, and a description thereof is omitted.

When the transform-basis adaptive selection mode is disabled (NO in S505), size determiner 2065 determines whether the transform size is at or below a constant limit (S701). Specifically, size determiner 2065 determines whether the horizontal size and the vertical size of a current block to be decoded are smaller than or equal to a second threshold size. Specifically, size determiner 2065 determines whether the product of the horizontal size and the vertical size of the current block is smaller than or equal to a threshold, for example.

Here, when the transform size is at or below the constant limit (YES in S701), first inverse transform basis selector 2066 selects the second basic transform basis as the first horizontal inverse transform basis and the first vertical inverse transform basis (S702). On the other hand, when the transform size exceeds the constant limit (NO in S701), first inverse transform basis selector 2066 selects the first basic transform basis as the first horizontal inverse transform basis and the first vertical inverse transform basis (S703).

Note that the decoding method consistent with the encoding method according to the third aspect illustrated in FIG. 16 may be adopted.

Advantageous Effects and Others

As described above, decoder 200 according to this aspect can yield similar advantageous effects to those achieved by encoder 100 according to the third aspect.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Eighth Aspect of Embodiment 1

Next, an eighth aspect of Embodiment 1 is to be described. In this aspect, an example of decoding various signals regarding the first transform and the second transform in the seventh aspect is to be described. Note that the decoder according to this aspect corresponds to the encoder according to the fourth aspect described above. The following specifically describes this aspect with reference to the drawings, focusing on differences from the fifth to seventh aspects.

Note that the internal configuration of inverse transformer 206 of decoder 200 according to this aspect is the same as that of the fifth aspect, and thus illustration thereof is omitted.

Figure 24B:
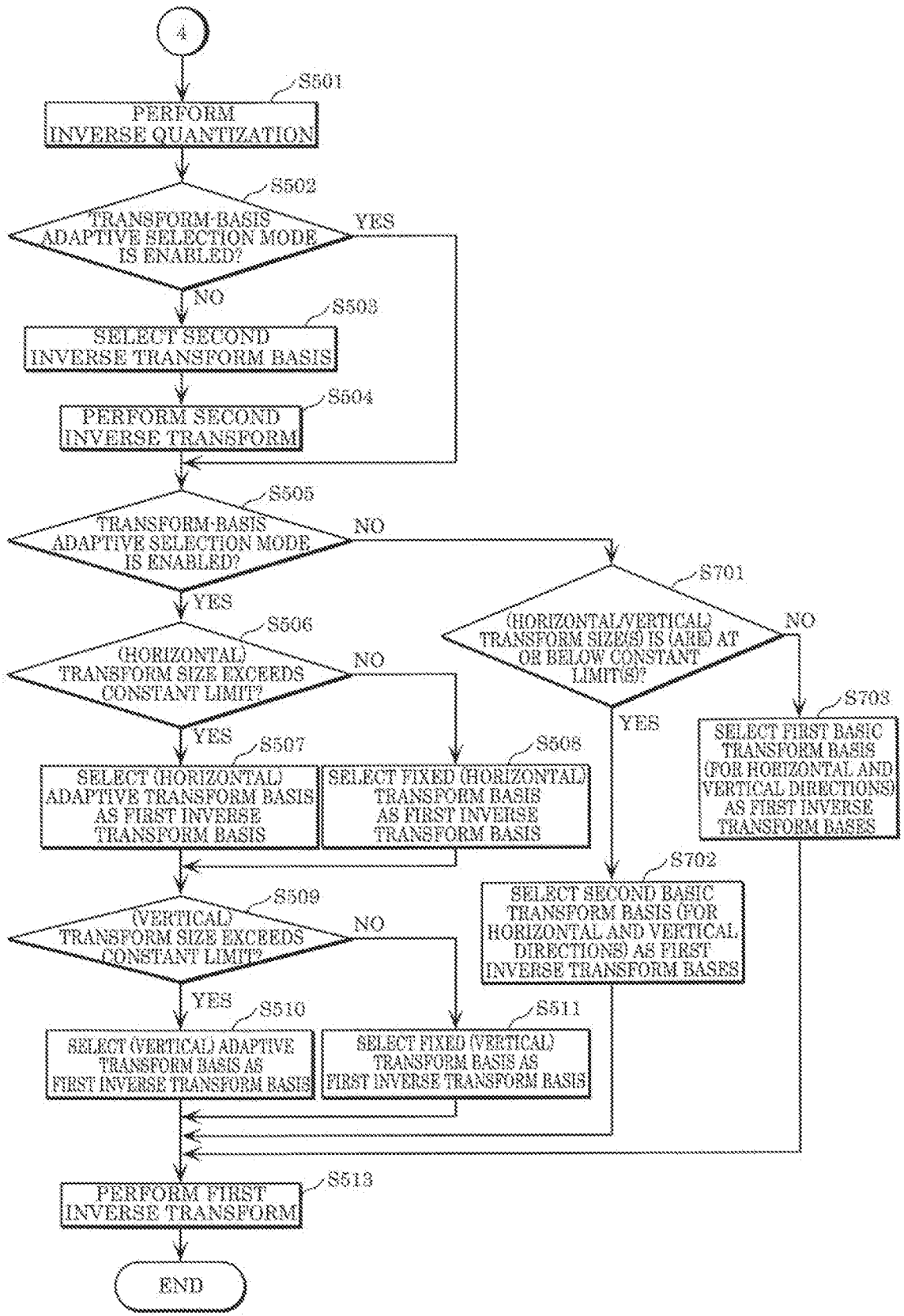
FIG. 24B is a flowchart illustrating processing performed by the inverse quantizer and the inverse transformer of the decoder according to the eighth aspect of Embodiment 1.

Processing Performed by Entropy Decoder, Inverse Quantizer, and Inverse Transformer of Decoder Processing performed by entropy decoder 202, inverse quantizer 204, and inverse transformer 206 of decoder 200 according to this aspect is to be described with reference to FIG. 24A and FIG. 24B. In FIG. 24A and FIG. 24B, the same numerals are given to the processes common to those in any of the fifth to seventh aspects, and a description thereof is omitted.

Entropy decoder 202 determines whether to skip decoding the transform-basis adaptive selection mode signal (S801). For example, if one of conditions (A) and (B) as below are satisfied, entropy decoder 202 determines that decoding the transform-basis adaptive selection mode signal is to be skipped, and if not, determines that decoding the transform-basis adaptive selection mode signal is not to be skipped.

(A) The transform-basis adaptive selection mode is disabled.
(B) The transform-basis adaptive selection mode is enabled, and furthermore all the following conditions (B1) to (B4) are satisfied.
(B1) The transform size is smaller than or equal to second threshold size W1×H1 used in step S701.
(B2) The horizontal transform size is smaller than first horizontal threshold size W2 used in step S506.
(B3) The vertical transform size is smaller than first vertical threshold size H2 used in step S509.
(B4) The second basic transform basis is the same as the horizontal and vertical fixed transform bases.

As a specific example, when second threshold size W1×H1 is 4×4 pixels, first horizontal threshold size W2 is 4 pixels, first vertical threshold size H2 is 4 pixels, and the second basic transform basis and the fixed transform bases are all transform bases of DST-VII, if the transform size is smaller than or equal to 4×4 pixels, entropy decoder 202 determines that decoding the transform-basis adaptive selection mode signal is to be skipped.

On the contrary, when neither of conditions (A) nor (B) above is satisfied, entropy decoder 202 determines that decoding the transform-basis adaptive selection mode signal is not to be skipped.

Here, when entropy decoder 202 determines that decoding the transform-basis adaptive selection mode signal is to be skipped (YES in S801), entropy decoder 202 skips steps S601 to S606, and decodes quantization coefficients (S607). On the other hand, when entropy decoder 202 determines that decoding the transform-basis adaptive selection mode signal is not to be skipped (NO in S801), entropy decoder 202 decodes quantization coefficients (S607) after performing steps S601 to S606, similarly to the sixth aspect.

Note that a decoding method consistent with the encoding method according to the fourth aspect illustrated in FIG. 17A, FIG. 17B, and FIG. 18 may be adopted.

Advantageous Effects and Others

As described above, decoder 200 according to this aspect yields similar advantageous effects to those achieved by encoder 100 according to the fourth aspect.

Combination with Other Aspects

This aspect may be performed in combination with at least a portion of other aspects of the present disclosure. A portion of the processing stated in the flowchart in this aspect, a portion of the configurations of devices, and a portion of syntax, for instance, may be combined with other aspects and performed.

Variation of Each Aspect of Embodiment 1

A signal that indicates whether to enable or disable a portion or all of the processes in the first to eighth aspects may be encoded and decoded. Such a signal may be encoded per coding unit (CU) or coding tree unit (CTU), or may be coded per sequence parameter set (SPS), picture parameter set (PPS), or slice unit according to the H.265/HEVC standard.

Based on a picture type (I, P, B), a slice type (I, P, B), a transform size (4×4 pixels, 8×8 pixels, or another size), the number of non-zero coefficients, a quantization parameter, Temporal_id (layer of hierarchical encoding), or an arbitrary combination thereof, selection of the first transform bases and the first transform may be skipped, and selection of the second transform basis and the second transform may be skipped.

When the encoders according to the first to fourth aspects perform the above operation, the decoders according to the fifth to eighth aspects also perform corresponding operation. For example, when an encoder encodes information indicating whether to enable or disable processing of skipping the first transform or the second transform, a decoder decodes the information, and determines whether the first transform or the second transform is enabled or disabled, and whether the information indicating the first transform or the second transform is encoded.

Embodiment 2

As described in the above embodiment, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in the embodiment may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in the above embodiment and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

FIG. 25 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiment on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

Decentralized Processing

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

3D, Multi-Angle

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

Scalable Encoding

The switching of content will be described with reference to a scalable stream, illustrated in FIG. 26, that is compression coded via implementation of the moving picture encoding method described in the above embodiment. The server may have a configuration in which content is switched while making use of the temporal and/or spatial scalability of a stream, which is achieved by division into and encoding of layers, as illustrated in FIG. 26. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 27:
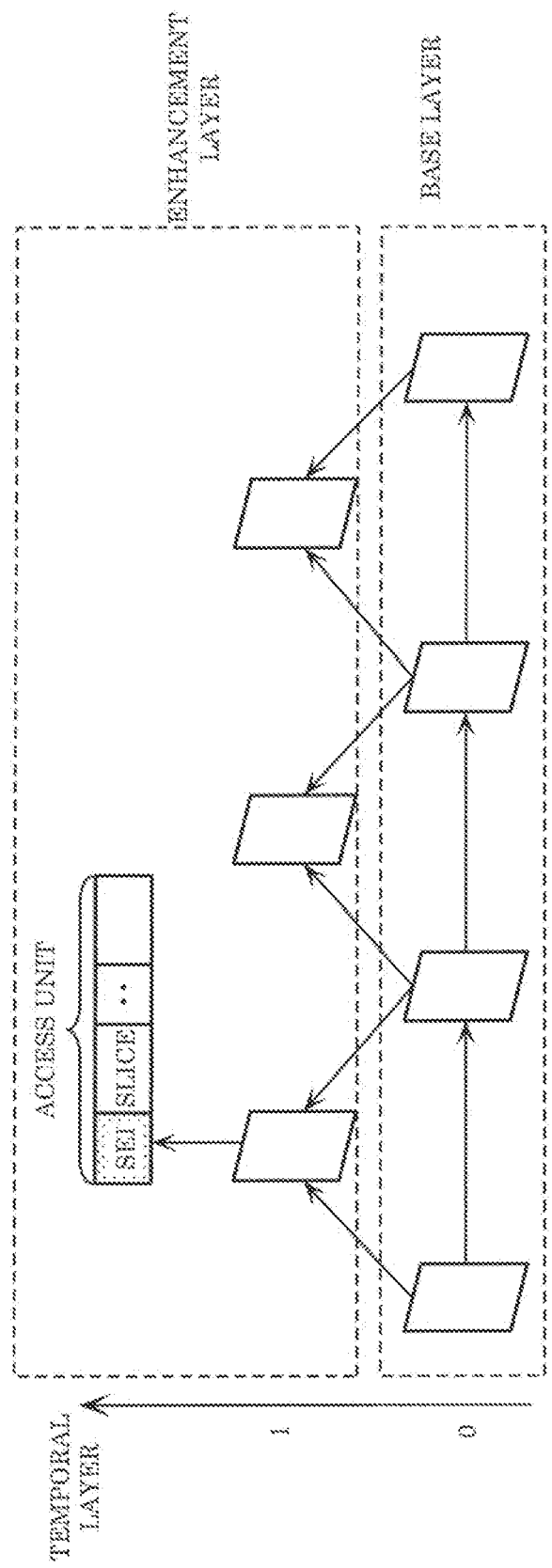
FIG. 27 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 27, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

Web Page Optimization

Figure 28:
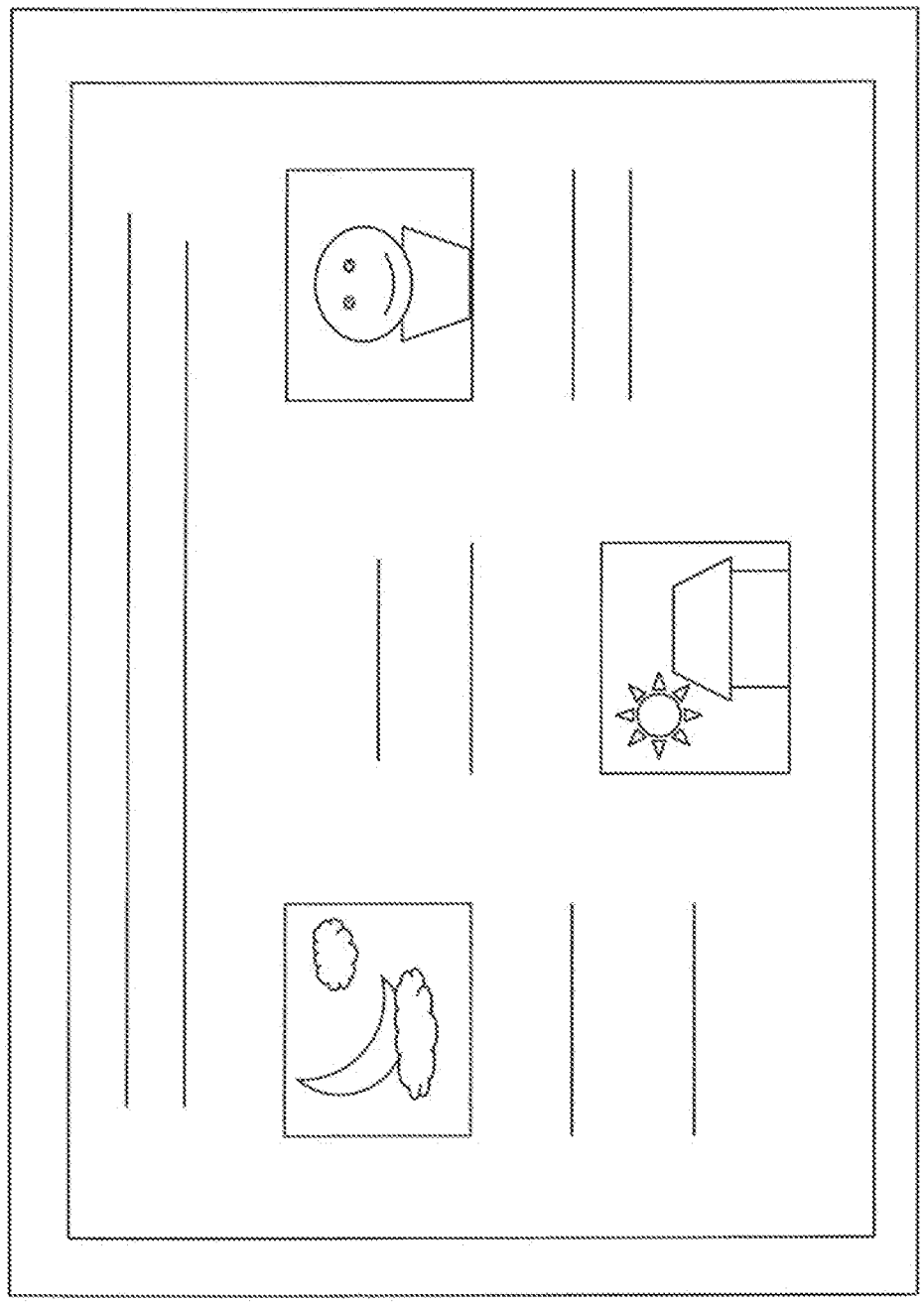
FIG. 28 illustrates an example of a display screen of a web page.
Figure 29:
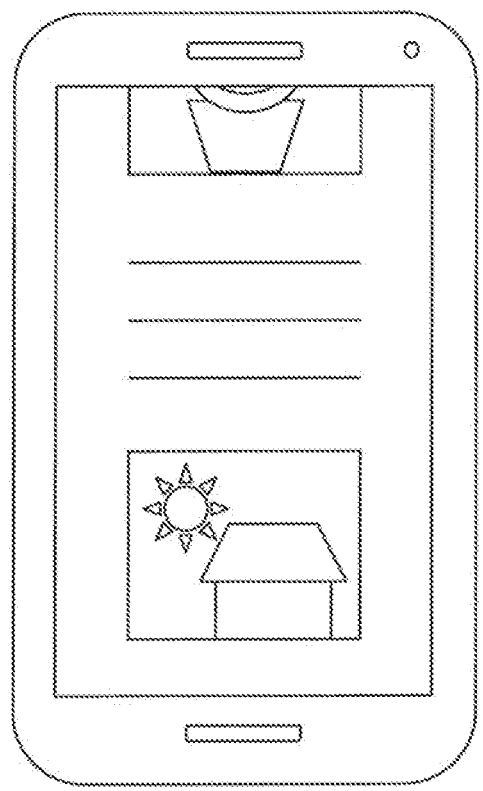
FIG. 29 illustrates an example of a display screen of a web page.

FIG. 28 illustrates an example of a display screen of a web page on, for example, computer ex111. FIG. 29 illustrates an example of a display screen of a web page on, for example, smartphone ex115. As illustrated in FIG. 28 and FIG. 29, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

Autonomous Driving

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

Streaming of Individual Content

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiment may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

Hardware Configuration

Figure 30:
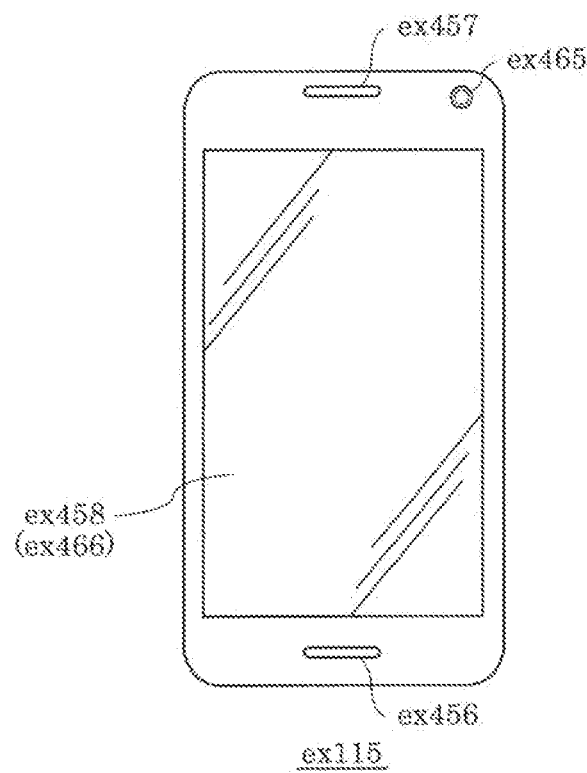
FIG. 30 illustrates one example of a smartphone.
Figure 31:
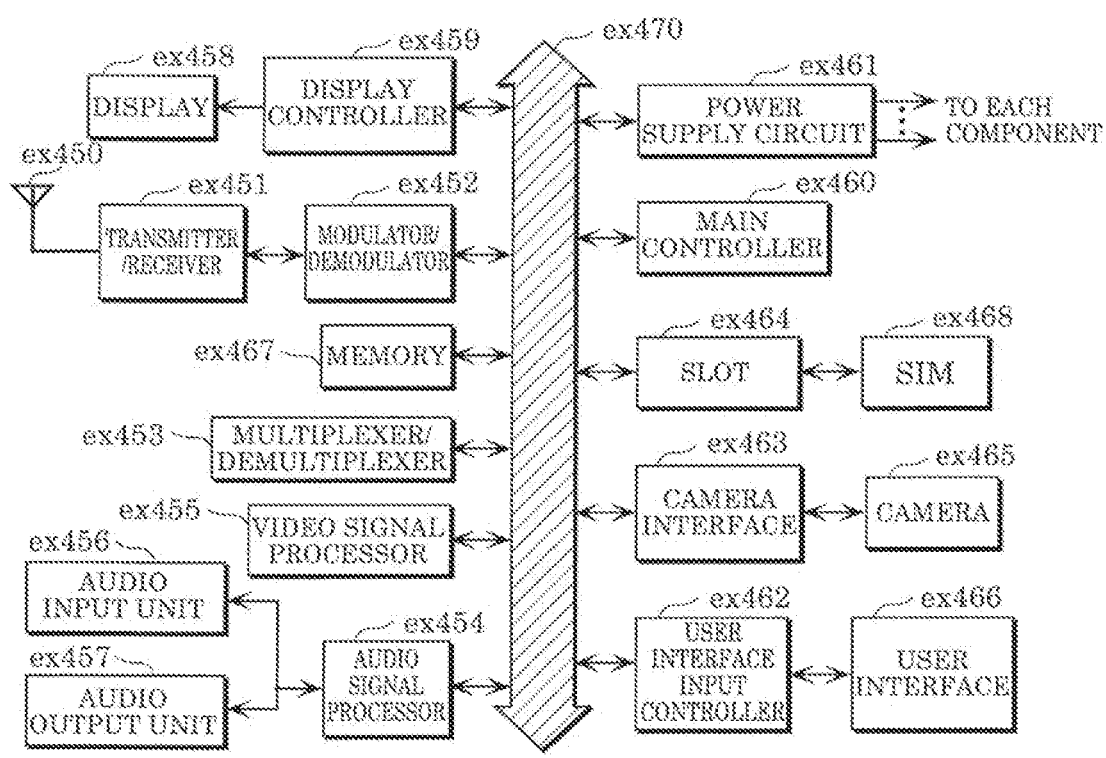
FIG. 31 is a block diagram illustrating a configuration example of a smartphone.

FIG. 30 illustrates smartphone ex115. FIG. 31 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiment, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiment, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, cellular phones, digital cameras, and digital video cameras.

What is claimed is:

1. An encoder comprising:
    circuitry; and
    memory,
    wherein the circuitry, using the memory, performs:
        generating first transform coefficients by performing a horizontal transform and a vertical transform on residuals using a horizontal transform basis and a vertical transform basis, respectively, when it is determined that the horizontal transform and the vertical transform are to be performed for the current block;
        generating second transform coefficients by performing a non-separable transform on the first transform coefficients when it is determined that the non-separable transform is to be performed for the current block; and
        encoding a signal which indicates whether the non-separable transform is performed or not,
    wherein (i) when it is determined that a selection of a transform basis based on a size of the current block is performed for the current block, the circuitry performs, before performing the horizontal transform and the vertical transform:
        selecting a first transform basis, as the horizontal transform basis, from among transform basis candidates when a horizontal size of the current block is a first horizontal size that is greater than a threshold size;
        selecting a second transform basis, as the horizontal transform basis, from among the transform basis candidates when the horizontal size of the current block is a second horizontal size that is smaller than or equal to the threshold size, the second transform basis being different from the first transform basis;
        selecting the first transform basis, as the vertical transform basis, from among the transform basis candidates when a vertical size of the current block is a first vertical size that is greater than the threshold size; and
        selecting the second transform basis, as the vertical transform basis, from among the transform basis candidates when the vertical size of the current block is a second vertical size that is smaller than or equal to the threshold size, and
    wherein (ii) when the non-separable transform is performed for the current block, a basic transform basis is selected as the vertical transform basis and the horizontal transform basis.

2. A decoder comprising:
    circuitry; and
    memory,
    wherein the circuitry, using the memory, performs:
        decoding a signal which indicates whether a non-separable inverse transform is performed or not from a bitstream;
        generating first transform coefficients by performing the non-separable inverse-transform on the second transform coefficients when it is determined that the non-separable inverse-transform is to be performed for the current block; and generating residuals by performing a horizontal inverse-transform and a vertical inverse-transform on the first transform coefficients using a horizontal inverse-transform basis and a vertical inverse-transform basis, respectively, when it is determined that the horizontal inverse-transform and the vertical inverse-transform are to be performed for the current block, wherein (i) when it is determined that a selection of a transform basis based on a size of the current block is performed for the current block, the circuitry performs, before performing the horizontal inverse-transform and the vertical inverse-transform:

selecting a first inverse-transform basis, as the horizontal inverse-transform basis, from among inverse-transform basis candidates when a horizontal size of the current block is a first horizontal size that is greater than a threshold size;

selecting a second inverse-transform basis, as the horizontal inverse-transform basis, from among the inverse-transform basis candidates when the horizontal size of the current block is a second horizontal size that is smaller than or equal to the threshold size, the second inverse-transform basis being different from the first inverse-transform basis;

selecting the first inverse-transform basis, as the vertical inverse-transform basis, from among the inverse-transform basis candidates when a vertical size of the current block is a first vertical size that is greater than the threshold size; and selecting the second inverse-transform basis, as the vertical inverse-transform basis, from among the inverse-transform basis candidates when the vertical size of the current block is a second vertical size that is smaller than or equal to the threshold size, and wherein (ii) when the non-separable inverse-transform is performed for the current block, a basic inverse-transform basis is selected as the vertical inverse-transform basis and the horizontal inverse-transform basis.

3. An encoding method comprising:

generating first transform coefficients by performing a horizontal transform and a vertical transform on residuals using a horizontal transform basis and a vertical transform basis, respectively, when it is determined that the horizontal transform and the vertical transform are to be performed for the current block;

generating second transform coefficients by performing a non-separable transform on the first transform coefficients when it is determined that the non-separable transform is to be performed for the current block; and encoding a signal which indicates whether the non-separable transform is performed or not, wherein (i) when it is determined that a selection of a transform basis based on a size of the current block is performed for the current block, the encoding method further comprising, before performing the horizontal transform and the vertical transform:

selecting a first transform basis, as the horizontal transform basis, from among transform basis candidates when a horizontal size of the current block is a first horizontal size that is greater than a threshold size;

selecting a second transform basis, as the horizontal transform basis, from among the transform basis candidates when the horizontal size of the current block is a second horizontal size that is smaller than or equal to the threshold size, the second transform basis being different from the first transform basis;

selecting the first transform basis, as the vertical transform basis, from among the transform basis candidates when a vertical size of the current block is a first vertical size that is greater than the threshold size; and selecting the second transform basis, as the vertical transform basis, from among the transform basis candidates when the vertical size of the current block is a second vertical size that is smaller than or equal to the threshold size, and wherein (ii) when the non-separable transform is performed for the current block, a basic transform basis is selected as the vertical transform basis and the horizontal transform basis.

4. A decoding method comprising:

decoding a signal which indicates whether a non-separable inverse transform is performed or not from a bitstream;

generating first transform coefficients by performing the non-separable inverse-transform on second transform coefficients when it is determined that the non-separable inverse-transform is to be performed for the current block; and generating residuals by performing a horizontal inverse-transform and a vertical inverse-transform on the first transform coefficients using a horizontal inverse-transform basis and a vertical inverse-transform basis, respectively, when it is determined that the horizontal inverse-transform and the vertical inverse-transform are to be performed for the current block, wherein (i) when it is determined that a selection of a transform basis based on a size of the current block is performed for the current block, the circuitry performs, before performing the horizontal inverse-transform and the vertical inverse-transform:

selecting a first inverse-transform basis, as the horizontal inverse-transform basis, from among inverse-transform basis candidates when a horizontal size of the current block is a first horizontal size that is greater than a threshold size;

selecting a second inverse-transform basis, as the horizontal inverse-transform basis, from among the inverse-transform basis candidates when the horizontal size of the current block is a second horizontal size that is smaller than or equal to the threshold size, the second inverse-transform basis being different from the first inverse-transform basis;

selecting the first inverse-transform basis, as the vertical inverse-transform basis, from among the inverse-transform basis candidates when a vertical size of the current block is a first vertical size that is greater than the threshold size; and selecting the second inverse-transform basis, as the vertical inverse-transform basis, from among the inverse-transform basis candidates when the vertical size of the current block is a second vertical size that is smaller than or equal to the threshold size, and wherein (ii) when the non-separable inverse-transform is performed for the current block, a basic inverse-transform basis is selected as the vertical inverse-transform basis and the horizontal inverse-transform basis.

\* \* \* \* \*